United States Patent [19]

Kawasaki et al.

[11] Patent Number: 4,746,540
[45] Date of Patent: May 24, 1988

[54] METHOD FOR FORMING ALLOY LAYER UPON ALUMINUM ALLOY SUBSTRATE BY IRRADIATING WITH A $CO_2$ LASER, ON SUBSTRATE SURFACE, ALLOY POWDER CONTAINING SUBSTANCE FOR ALLOYING AND SILICON OR BISMUTH

[75] Inventors: Minoru Kawasaki; Soya Takagi; Kazuhiko Mori; Shinji Kato, all of Toyota, Japan

[73] Assignee: Toyota Jidosha Kabushiki Kaisha, Aichi, Japan

[21] Appl. No.: 894,941

[22] Filed: Aug. 8, 1986

[30] Foreign Application Priority Data

Aug. 13, 1985 [JP] Japan ................... 60-178430
Aug. 13, 1985 [JP] Japan ................... 60-178431

[51] Int. Cl.$^4$ .............................................. B05D 3/06
[52] U.S. Cl. .................... 427/53.1; 219/76.1; 219/121 LC; 219/121 LD; 219/121 LF
[58] Field of Search ............ 427/53.1; 219/76.1, 219/121 LC, 121 LD, 121 L, 121 LF

[56] References Cited

U.S. PATENT DOCUMENTS 4,125,926 11/1978 Gale ...................... 427/53.1
4,157,923 6/1979 Yen et al. .................. 148/4
4,212,900 7/1980 Serlin ..................... 427/53.1
4,382,169 5/1983 Rabkin .................... 427/53.1
4,401,726 8/1983 Gnanamuthu ............... 427/53.1
4,451,302 5/1984 Prescott et al. ............ 148/13.1

FOREIGN PATENT DOCUMENTS 0117352 9/1984 European Pat. Off. .
0219468 12/1984 Japan .................... 427/53.1

Primary Examiner—Sam Silverberg
Attorney, Agent, or Firm—Parkhurst & Oliff

[57] ABSTRACT

In this method for forming an alloy layer on the surface of an aluminum alloy substrate, a powder for alloying, containing a substance to be alloyed with the substrate and an element selected from the group consisting of silicon and bismuth, is disposed upon the surface of the aluminum alloy substrate. This powder is then irradiated with a $CO_2$ laser, so as to be melted and fused together with a surface portion of the aluminum alloy substrate, so that these two are alloyed together. The powder for alloying may be a powder of an alloy of the substance to be alloyed with the aluminum alloy substrate and the element selected from the group consisting of silicon and bismuth, or alternatively may be a mixture of a powder of the substance to be alloyed with the aluminum alloy substrate and a powder of the element selected from the group consisting of silicon and bismuth.

4 Claims, 14 Drawing Sheets (×10)

(×10)

(×10)

(×10)

(x100)

(x100)

(×10)

(×10)

(x10)

(x10)

METHOD FOR FORMING ALLOY LAYER UPON ALUMINUM ALLOY SUBSTRATE BY IRRADIATING WITH A $CO_2$ LASER, ON SUBSTRATE SURFACE, ALLOY POWDER CONTAINING SUBSTANCE FOR ALLOYING AND SILICON OR BISMUTH

BACKGROUND OF THE INVENTION

The present invention relates to a method for forming an alloy layer upon a substrate metal which is an alloy of aluminum, and more particularly relates to such a method for forming an alloy layer upon a substrate metal, in which the layer is formed by the use of $CO_2$ laser.

The present invention has been described in Japanese Patent Applications Ser. Nos. 60-178430 (1985) and 60-178431 (1985), both filed by an applicant the same as the entity assigned or owed duty of assignment of the present patent application; and the present patent application hereby incorporates into itself by reference the texts of said Japanese Patent Applications and the claims and the drawings thereof; copies are appended to the present application.

In order to improve the surface qualities of a portion of the surface of a quantity of a substrate metal material such as aluminum alloy, such as for example in order to improve the corrosion resistance, the heat resistance, or the wear resistance of the surface of a member at least largely made of such substrate metal material, it is per se known to be effective to alloy an alloy material into said surface portion of said substrate metal material. One way in which this surface alloying has been performed in the prior art has been to dispose a quantity of the appropriate alloy material on the surface of the substrate metal material, and then to fuse together said alloy material and said substrate metal material by heating by the use of a high energy source such as a laser, a TIG arc, or an electron beam. After the fused portion has solidified, an alloy layer is thus formed, said alloy layer, if the parameters of the process are appropriate and correct, having the appropriately enhanced surface properties.

However, this type of process is fraught with problems which will now be outlined. In the typical event that the heating source which is utilized is a $CO_2$ type laser of the type which is conventionally used for metal processing and the like, and when the substrate metal material is aluminum alloy which is a typical metal alloy material the surface of parts made from which it is desirable to reinforce, because the aluminum alloy substrate material has a low electrical resistance it is not possible to easily fuse the surface portion of said aluminum alloy substrate material and the alloy material to be added thereto, and it is not in practice possible to form the desired reinforcing surface alloy layer. This is because the layer absorption X is determined by the relationship $$X = 2(mn)^{\frac{1}{2}}$$

where the electrical resistance of the metal material which is being irradiated by the $CO_2$ laser is "m" (expressed in micro ohm centimeters) and the frequency of the electromagnetic radiation emitted by the laser is "n". A $CO_2$ laser emits thermal energy which is electromagnetic radiation in the near infrared wave band with a wave length of about 10.6 microns, and aluminum alloys generally have a low electrical resistance. Thus, even when a substrate piece of aluminum alloy material in the solid form is irradiated by a $CO_2$ laser which delivers electromagnetic radiation of considerable power, the beam from the $CO_2$ laser is substantially completely reflected off the surface of the solid substrate aluminum alloy piece, and accordingly the absorption of said laser beam has a very low value, and it is in practice impracticable to heat up the surface of said substrate aluminum alloy piece sufficiently to cause fusing thereof.

If, in order to overcome this phenomenon, an attempt is made to force the alloying process by the simple expedient of increasing the power of the $CO_2$ laser, then the thermal shock applied not only to the alloy material but also to the substrate aluminum alloy material piece becomes excessive, as a result of which the alloy material becomes scattered and the substrate aluminum alloy material piece becomes pitted and develops relatively large holes. This produces poor alloying. Also, there is the subsidiary problem that the $CO_2$ laser is required to be of higher output than otherwise, and therefore there is the problem of high capital cost for the alloying process, as well as higher operating cost.

Further, for substantially all aluminum alloys, although when in the solid state the beam from a $CO_2$ laser is substantially completely reflected as described above, on the other hand when in the molten state said beam from said $CO_2$ laser is absorbed with relatively high efficacy. Therefore, when forming an alloy surface layer by the method described above using a $CO_2$ laser, the stage of heating up the solid surface of the substrate with alloy material thereon up to the melting point at which said surface becomes liquid is very important, and has conventionally been carried out by forming a powder of the alloy material. This has been done in order to cause the beam from the $CO_2$ laser to be reflected diffusely within the alloy material powder layer, thus to be better absorbed thereby, and further in order to reduce the heat capacity of said alloy material layer in order to cause said alloy material to fuse easily. However, if the alloy material is merely made into a powder as described above, then, when the substrate metal material is aluminum alloy as described above, since said substrate metal material has relatively low electrical resistance, the absorption of the beam from the $CO_2$ laser by said substrate metal material itself is extremely low, as a result of which it is very difficult to form easily the desired alloy surface layer.

Furthermore, considering the question of forming an alloy surface layer upon a metal substrate material in the manner described above from the point of view of metallurgy, in order to form a suitable alloy layer, the ability of the alloy material to form a solid solution with the material of the metal substrate material (the so called "wettability" thereby) and the uniformity of the form of the compound in deposition in the alloy layer are very important. The degree of solid solution of the alloy material can in principle be determined from conventional equilibrium state diagrams and various other research data, and it is desirable in order to form an appropriate alloy layer to make the degree of solid solution of the alloy material relatively high. In a normal type of fusing method such as die welding, the speed of cooling of the fused portion is relatively slow, as a result of which it is difficult to make the degree of solid solution of the alloy material high; but, on the other hand, by using a $CO_2$ laser as the heat source and by carrying out the method as described above, the molten and fused portion is cooled rapidly by the absorption of heat by the main portion of the matrix material, as a result of which the cooling speed of said fused portion is extremely high and therefore the degree of solid solution of the alloy material is higher than in the cases shown by the equilibrium state diagrams, and thus even materials which are relatively difficult to be alloyed together may be made into a mutual alloy relatively easily, as compared with a normal type of fusing method. Therefore, with the above described type of method using a $CO_2$ laser as the heat source, the range of choice of materials to be alloyed together may be extended, as compared with the case in which a normal type of fusing method is employed.

However, with regard to the uniformity of the constitution of the alloy layer, since the application of heat and the cooling of the alloyed material are carried out rapidly, and since the degree of agitation of the molten melt portion is inevitably relatively inadequate, a temperature difference arises between the surface layer of said molten melt portion and the portion of said molten melt portion at its bottom and adjacent to the substrate aluminum alloy material, and, particularly in the case that the alloy material is one which easily forms one or more compounds with aluminum, within the deposited alloy layer various compounds tend to be formed. In order to prevent this phenomenon from occurring, or at least to mitigate the effects thereof, it is desirable that such compounds should be distributed relatively evenly in the aluminum which is the principal material making up the aluminum alloy substrate material, and that an element which forms eutectic crystallization should be added to the alloy material; and therefore it is desirable that the alloy material should include a certain quantity of an element which has a relatively small difference of specific gravity from aluminum.

SUMMARY OF THE INVENTION

The inventors of the present invention considered the various problems detailed above in the case when an alloy layer is to be formed on the surface of an aluminum alloy substrate material, from the point of view of the desirability of utilizing a $CO_2$ laser as the heat source for melting and fusing together said alloy layer; and, as a result of various experimental researches to be detailed hereinafter, the present inventors have come to the knowledge that it is effective to include a proportion of either silicon or bismuth along with the material that is to be alloyed with the aluminum alloy substrate material, for providing eutectic crystallization as described above.

Accordingly, it is the primary object of the present invention to provide a method for forming an alloy layer on the surface of an aluminum alloy substrate by the use of a $CO_2$ laser, which avoids the problems detailed above.

It is a further object of the present invention to provide such a method for forming an alloy layer on the surface of an aluminum alloy substrate, which provides good and easy fusing of the surface layer of the aluminum alloy substrate and an alloy material applied thereon.

It is a further object of the present invention to provide such a method for forming an alloy layer on the surface of an aluminum alloy substrate, which overcomes any problems of low laser beam absorption by the solid aluminum alloy substrate surface layer.

It is a further object of the present invention to provide such a method for forming an alloy layer on the surface of an aluminum alloy substrate, which does not require an unduly high thermal energy output from the $CO_2$ laser.

It is a further object of the present invention to provide such a method for forming an alloy layer on the surface of an aluminum alloy substrate, which does not entail the alloy material becoming scattered during the alloy layer formation process.

It is a further object of the present invention to provide such a method for forming an alloy layer on the surface of an aluminum alloy substrate, which does not entail the aluminum alloy substrate material or the alloy material being subjected to an unduly great thermal shock.

It is a further object of the present invention to provide such a method for forming an alloy layer on the surface of an aluminum alloy substrate, which does not result in the production of pits or holes in the aluminum alloy substrate material or in the alloy layer.

It is a yet further object of the present invention to provide such a method for forming an alloy layer on the surface of an aluminum alloy substrate, which does not entail either high capital cost or high operational cost.

It is a yet further object of the present invention to provide such a method for forming an alloy layer on the surface of an aluminum alloy substrate, which allows the degree of solid solution of the alloy material to be made to be high.

It is a yet further object of the present invention to provide such a method for forming an alloy layer on the surface of an aluminum alloy substrate, which allows the range of choice of alloy material to be broad, by comparison with a conventional type of fusing method.

It is a yet further object of the present invention to provide such a method for forming an alloy layer on the surface of an aluminum alloy substrate, which provides an alloy layer of relatively uniform constitution.

According to the most general aspect of the present invention, these and other objects are attained by a method for forming an alloy layer on the surface of an aluminum alloy substrate, comprising the steps of: (a) disposing an powder for alloying, containing a substance to be alloyed with said aluminum alloy substrate, and an element selected from the group consisting of silicon and bismuth, upon the surface of said aluminum alloy substrate; and: (b) irradiating with a $CO_2$ laser said powder for alloying as disposed upon said surface of said aluminum alloy substrate, so as to melt and fuse said powder for alloying and a surface portion of said aluminum alloy substrate and so as to alloy them together.

According to such a method as specified above, since the powder for alloying includes either silicon or bismuth, in addition to the substance, such as for example stellite, copper or nickel, for being alloyed with the aluminum alloy substrate, thereby said powder for alloying has a relatively high electrical resistance as compared with the element for being alloyed with the substrate by itself; and thereby the absorption of the beam emitted by the laser by said powder for alloying is relatively high, and therefore said powder for alloying fuses and melts relatively easily. By the fusing of said powder for alloying, the laser beam absorption thereby is further enhanced, and as a result the surface portion of the aluminum alloy substrate is relatively easily fused. Thus, as compared with the conventional art outlined earlier in this specification, an alloy layer can be much more easily formed on the surface of the aluminum alloy substrate material block, and this alloy layer can be formed of a relatively excellent quality not substantially including any blow holes or other such defects.

Since according to the present invention the fusing and the melting of the alloying powder can be performed relatively easily, as compared with the case when no such additive as the silicon or bismuth is employed and the element to be alloyed with the aluminum alloy substrate is attempted to be alloyed by itself by laser irradiation with a $CO_2$ laser as was the case in the prior art, therefore it is possible to utilize as alloying powders powders including elements to be alloyed which cannot be very easily fused by a $CO_2$ laser, due to the increased efficacy of the process; and this wider possible range of choice for the element to be alloyed makes it possible to form alloy layers having a much wider range of desirable characteristics such as corrosion resistance or the like, as required for the surface portion of the aluminum alloy matrix metal.

Since, according to the present invention, there is no requirement to utilize a $CO_2$ laser of very high output power, as was required in the prior arts detailed earlier, the installation or capital cost and the operating cost of the apparatus can be minimized. Thereby, as compared with the case of the conventional art, an alloy layer can be formed on the surface of a block of aluminum alloy substrate material at relatively low overall cost.

Further, according to a particular specialization of the present invention, the above specified and other objects are more particularly attained by a method for forming an alloy layer on the surface of an aluminum alloy substrate as specified above, wherein said powder for alloying is a mixture of a powder of said substance to be alloyed with said aluminum alloy substrate and a powder of said element selected from the group consisting of silicon and bismuth. However, according to the results of certain experimental researches performed by the present inventors, to be detailed hereinafter, it has been determined that, when a mixture of powders as specified above is utilized as the powder for alloying, metallic compounds tend to be formed between the silicon or the bismuth and the alloy element or elements, and these metallic compounds tend to become agglomerated in the surface layer of alloy formed on the substrate aluminum alloy block. Accordingly, more preferably, according to an alternative particular specialization of the present invention, the above specified and other objects are more particularly attained by a method for forming an alloy layer on the surface of an aluminum alloy substrate as specified above, wherein said powder for alloying is a powder of an alloy of said substance to be alloyed with said aluminum alloy substrate and said element selected from the group consisting of silicon and bismuth.

Further, according to the results of said experimental researches performed by the present inventors, to be described in detail hereinafter, it has been determined that, when the content of silicon or bismuth of the powder for alloying is too low, it becomes difficult to form the alloy layer properly. Therefore, according to one more particular specialization of the present invention, when a mixture of powders as specified above is utilized as the powder for alloying: if the added substance is silicon, the above specified and other objects are more particularly attained by a method for forming an alloy layer on the surface of an aluminum alloy substrate as specified above, wherein the silicon content of said powder for alloying is at least about 17%; and more preferably said silicon content of said powder for alloying will be at least about 35%; and even more preferably said silicon content of said powder for alloying will be at least about 42%; but, if the added substance is bismuth, the above specified and other objects are more particularly attained by a method for forming an alloy layer on the surface of an aluminum alloy substrate as specified above, wherein the bismuth content of said powder for alloying is at least about 21%; and more preferably said bismuth content of said powder for alloying will be at least about 35%; and even more preferably said bismuth content of said powder for alloying will be at least about 41%. On the other hand, according to another particular specialization of the present invention, when a powdered alloy as specified above is utilized as the powder for alloying: if the added substance is silicon, the above specified and other objects are more particularly attained by a method for forming an alloy layer on the surface of an aluminum alloy substrate as specified above, wherein the silicon content of said powder for alloying is at least about 13%, and more preferably said silicon content of said powder for alloying will be at least about 26%, and even more preferably said silicon content of said powder for alloying will be at least about 30%, but, if the added substance is bismuth, the above specified and other objects are more particularly attained by a method for forming an alloy layer on the surface of an aluminum alloy substrate as specified above, wherein the bismuth content of said powder for alloying is at least about 15%; and more preferably said bismuth content of said powder for alloying will be at least about 28%; and even more preferably said bismuth content of said powder for alloying will be at least about 32%.

Further, according to others of the results of said experimental researches performed by the present inventors, also to be described in detail hereinafter, it has been determined that, when the particle size of the powder for alloying (if it is an alloy powder) or of the silicon or bismuth powder mixed therein (if it is a mixture of powders) is too low, it becomes difficult to dispose said powder for alloying evenly on the surface of the aluminum alloy substrate, and it becomes difficult to form the alloy layer properly. Therefore, according to one more particular specialization of the present invention, when a mixture of powders as specified above is utilized as the powder for alloying: if the added substance is silicon, the above specified and other objects are more particularly attained by a method for forming an alloy layer on the surface of an aluminum alloy substrate as specified above, wherein the average particle size of the silicon powder included in said powder for alloying is not more than about −24 mesh; and more preferably said silicon particle average particle size will be not more than about −32 mesh; and even more preferably said silicon particle average particle size will be not more than about −42 mesh; but, if the added substance is bismuth, the above specified and other objects are more particularly attained by a method for forming an alloy layer on the surface of an aluminum alloy substrate as specified above, wherein the average particle size of the bismuth powder included in said powder for alloying is not more than about −42 mesh; and more preferably said bismuth particle average particle size will be not more than about −48 mesh; and even more preferably said bismuth particle average particle size will be between about −55 mesh and about −325 mesh.

On the other hand, according to another particular specialization of the present invention, when a powdered alloy as specified above is utilized as the powder for alloying: if the added substance is silicon, the above specified and other objects are more particularly attained by a method for forming an alloy layer on the surface of an aluminum alloy substrate as specified above, wherein the average particle size of the silicon powder included in said powder for alloying is not more than about −24 mesh; and more preferably said silicon particle average particle size will be not more than about −32 mesh; and even more preferably said silicon particle average particle size will be not more than about −42 mesh; but, if the added substance is bismuth, the above specified and other objects are more particularly attained by a method for forming an alloy layer on the surface of an aluminum alloy substrate as specified above, wherein the average particle size of the bismuth powder included in said powder for alloying is not more than about −42 mesh; and more preferably said bismuth particle average particle size will be not more than about −48 mesh; and even more preferably said bismuth particle average particle size will be between about −55 mesh and about −325 mesh.

According to yet another particular specialization of the present invention, the alloy of said powder for alloying and said surface portion of said aluminum alloy substrate, as fused and melted by said $CO_2$ laser, may be cooled and solidified principally by heat conduction to the main body of said aluminum alloy substrate. According to this, no special means is required for cooling said fused and molten portion, and yet said molten portion is relatively rapidly cooled, as a result of which the crystalline structure thereof is relatively fine, and therefore an alloy layer of high strength and good hardness can be formed on the surface of the aluminum alloy substrate material piece.

According to yet another particular specialization of the present invention, said irradiation of said powder for alloying as disposed upon said surface of said aluminum alloy substrate by said $CO_2$ laser may be performed in an inert atmosphere. According to this concept, the occurrence of defects such as the inclusion of relatively large amounts of metallic oxides in the alloy layer and the formation of blow holes and the like due to oxidization of the alloying powder is avoided. In this case, the inert atmosphere may be provided by a flux such as in the case of welding, but for positive results and to avoid envelopment of the work in slag, and to improve workability, it is preferable to employ an inert gas atmosphere composed of a gas such as argon or helium or the like, or indeed a vacuum atmosphere.

Now, to consider the manner in which the powder for alloying is disposed in the path of the laser beam, according to one yet another particular specialization of the present invention, said powder for alloying may be disposed upon said surface of said aluminum alloy substrate by being supplied in loose powder form thereonto into the path of the beam produced by said $CO_2$ laser. In this case, a carrier inert gas may be fed into said loose powder form supply of said powder for alloying. However, in order properly to prevent dispersal of said powder for alloying, it is really more preferable, alternatively, to dispose a compressed powder form of said powder for alloying upon said surface of said aluminum alloy substrate, optionally by forming grooves in said surface of said aluminum alloy substrate and by compression forming said compressed powder form of said powder for alloying into said grooves. Alternatively, said powder for alloying may be disposed upon said surface of said aluminum alloy substrate by being applied thereon as a paste including a binder, such as for example an aqueous solution of polyvinyl alcohol or a mixture of acrylic and thinner. The application of such a paste upon said surface of said aluminum alloy substrate may be by application by a spatula or via a tube, and, in the case where the thickness of the alloy layer to be formed on the surface of the aluminum alloy substrate is small, said powder for alloying may be formed into a slurry by dispersal in a solvent such as for example an aqueous solution of polyvinyl alcohol, and then this slurry may be applied to the surface of the aluminum alloy substrate by painting with a brush or the like, by spraying, or by dipping. When, however, a paste or a slurry is formed, it is preferable for the thermal fusing process by the beam of the $CO_2$ laser to be performed when it is ensured that the slurry contains substantially no water, i.e. after sufficient drying at an appropriate temperature range in an atmosphere such that pores are not produced in the surface portion of the slurry layer and such that said surface portion of the slurry layer is not substantially oxidized.

It should be noted that, in the present specification, all percentages are percentages by weight.

BRIEF DESCRIPTION OF THE DRAWINGS

The present invention will now be described with respect to the preferred embodiments thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures relating to one preferred embodiment, and like parts and gaps and spaces and so on in the figures relating to different preferred embodiments; and:

DESCRIPTION OF THE PREFERRED EMBODIMENTS

Figure 1:
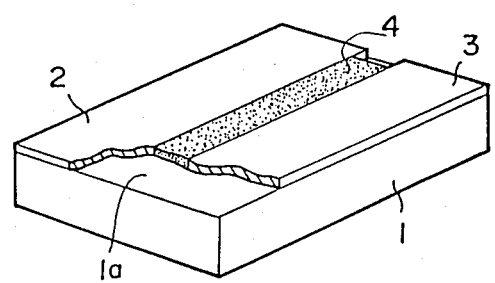
FIG. 1 is a side perspective view of a first stage of practice of the first set of preferred embodiments of the alloy layer forming method of the present invention, as well as of two comparison alloy layer forming methods, in which there is shown the forming by molding of a strip layer of alloy powder on the surface of an aluminum alloy substrate block.

The present invention will now be described with reference to the preferred embodiments thereof, and with reference to the figures.

The First Class of Preferred Embodiments, Utilizing Silicon

In the first class of preferred embodiments which will be described, incorporating ten subclasses or set thereof, silicon powder is used for admixture with the alloy material. This is the first of the two materials that have been found by the present inventors to be suitable for this application.

The first set of preferred embodiments, with comparison samples (Powdered stellite alloy mixed with powdered silicon)

FIGS. 1 through 4 show successive stages of the general method of practice of the first set of preferred embodiments of the alloy layer on substrate forming method of the present invention.

Initially, a first quality designated as "A" of alloy powder was produced by evenly combining together in a weight ratio of approximately 1:1 a quantity of silicon powder of average particle size approximately −50 mesh and a quantity of stellite alloy powder (composition approximately 24% chromium, approximately 4% tungsten, approximately 8% nickel, approximately 0.5% silicon, approximately 0.1% boron, not more than 0.4% carbon, and remainder substantially cobalt) of average particle size approximately −100 mesh. Similarly, a second quantity designated as "B" of alloy powder was produced by evenly combining together in a weight ratio of approximately 1:1 a quantity of silicon powder of average particle size approximately −250 mesh and a quantity of similarly composed stellite alloy powder of average particle size approximately −100 mesh. These alloy powder quantities "A" and "B" were, as will be seen, constituted so as to be suitable for practice of the two preferred embodiments of the method of the present invention included in the first set thereof. And for the practice of a comparison method, not according to the present invention, there was produced a quantity designated as "C" of a third powder, being similarly composed stellite powder only, of average particle size approximately −100 mesh. And, next, to each of these powders for alloying there was added a quantity of 5% aqueous solution of polyvinyl alcohol, to serve as a binder, and this in each of the three cases there was formed a paste with a viscosity higher than that of water and lower than that of clay.

Next, four substrate material test sample pieces 1 were prepared, each being a cuboidal block with dimensions approximately 70 mm × 40 mm × 10 mm, and being made of aluminum alloy of JIS (Japanese Industrial Standrd) ADC-10. And, as shown in the side perspective view of FIG. 1 which shows the first stage of practice of these first set of preferred embodiments, on each of the 70 mm × 40 mm surfaces denotes as 1a of three of these four aluminum alloy substrate material pieces 1 there were laid two guide plates 2 and 3 of suitable material, of thickness about 1 mm, with their longer edges parallel to and confronting one another and separated by about 5 mm. And then, after each of these three assemblies, a quantity designated as 4 of one of the above described three pastes made from the alloy powder quantities "A", "B", and "C" was packed into the gap between said two guide plates 2 and 3, with the top of said quantity 4 of paste leveled off.

Figure 2:
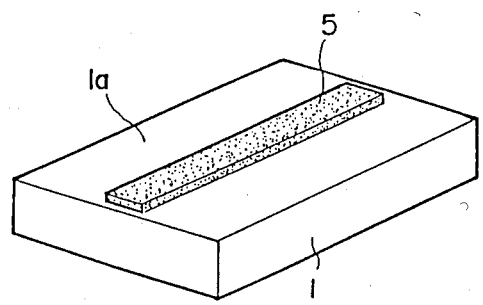
FIG. 2 is a side perspective view of a second stage of practice of said first set of preferred embodiments and of said two comparison methods, showing said alloy powder strip layer with the molds therefor removed.

In the next stage, not particularly shown in any figure, each of the assemblies as shown in FIG. 1 was heated to a temperature of about 100 C. in a drying oven and was maintained at said temperaure for about one hour; thus in each case the alloy powder paste quantity 4 was thoroughly dried. Then, in each case, the two guide plates 2 and 3 were removed, to leave as shown in FIG. 2 in perspective view the block 1 of aluminum alloy substrate material with a strip layer 5 of the corresponding alloy powder laid along its 70 mm × 40 mm surface 1a parallel to and midway between the long sides thereof, said strip layer 5 being bound together and congealed to the block 1 by the hardened binder. In each case, said strip layer 5 had width about 5 mm, thickness about 10 mm, and length about 60 mm. Further, on the 70 mm × 40 mm surface 1a of the fourth aluminum alloy substrate material piece 1 there was laid, parallel to and midway between the long sides thereof, a strip piece designated as "D" made of so called D-6k alloy material (composition approximately 30% chromium, approximately 4.5% tungsten, approximately 1.0% carbon, and remainder substantially cobalt), of dimensions width about 5 mm, thickness about 0.5 mm, and length about 60 mm.

Figure 3:
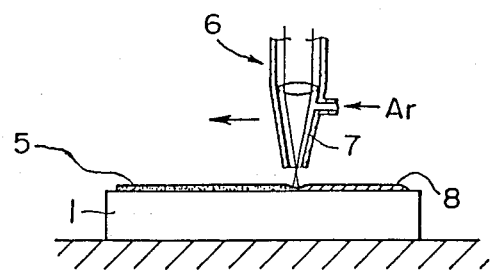
FIG. 3 is a side view of a third stage of practice of said first set of preferred embodiments and of said two comparison methods, showing a laser gun being scanned along such a strip layer of alloy material from one end thereof to the other.
Figure 4:
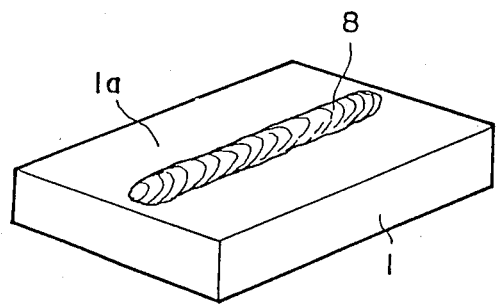
FIG. 4 is a side perspective view showing the appearance of the resultant beads of fused and melted together alloy material and substrate aluminum alloy material formed along the surface of the substrate material blocks.

Next, as shown in side view in FIG. 3, a laser gun 6 was scanned in one pass along each of these strips 5 of material (either congealed alloy powder or strip material) for being alloyed with the substrate aluminum alloy block 1, from one end thereof to the other, while simultaneously a stream of argon gas was emitted from the end of said laser gun 6, said argon gas stream acting as a shield gas. The laser gun 6 was at this time operated so as to emit laser radiation, denoted in FIG. 3 and 7, and this process caused local heating of the strip 5 of material for alloying and melting thereof. The laser output was about 2.0 kilowatts; the output mode was multi mode; the beam pattern was elliptical, with the long diameter about 5 mm and the short diameter about 3.5 mm; the laser scanning speed was about 300 mm per minute; and the flow rate of the argon shield gas was about 35 liters per minute. Thus, as shown in side perspective view in FIG. 4, a bead portion 8 of fused and melted together alloy material (powder or strip) and substrate aluminum alloy material was formed along the 70 mm×40 mm surface 1a of each substrate material block 1, parallel to and midway between the long sides thereof. During this process, the molten portion was cooled rapidly, principally by absorption of the heat therein by the main body of the substrate material block 1.

Figure 5:
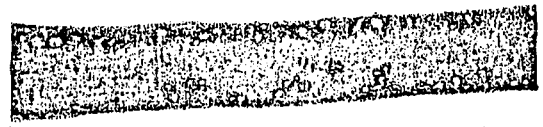
FIG. 5 is a plan view showing the appearance of the said bead, produced according to the first one of said first set of preferred embodiments of the present invention.
Figure 6:
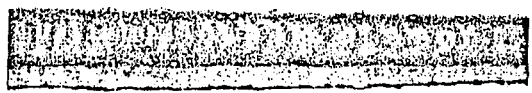
FIG. 6, similarly to FIG. 5 for the first one of said first preferred embodiment set, is a plan view showing the appearance of the said bead, produced according to the second one of said first set of preferred embodiments of the present invention.
Figure 7:
FIG. 7 is a similar plan view, showing the appearance of the said bead, produced according to the first comparison method, not according to the present invention.
Figure 8:
FIG. 8, similarly to FIG. 7 for the first comparison method, is a plan view, showing the appearance of the said bead, produced according to the second comparison method, also not according to the present invention.
Figure 9:
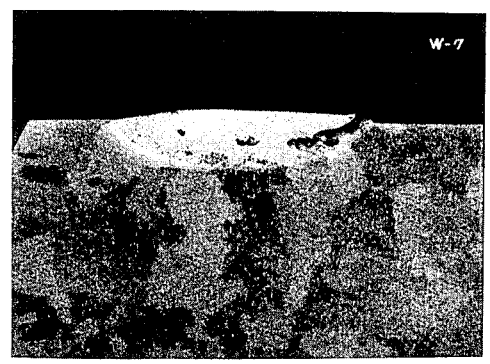
FIG. 9 is a transverse cross sectional photomicrograph taken at a magnification of 10×, showing said bead produced according to said first one of said first set of preferred embodiments of the present invention.
Figure 10:
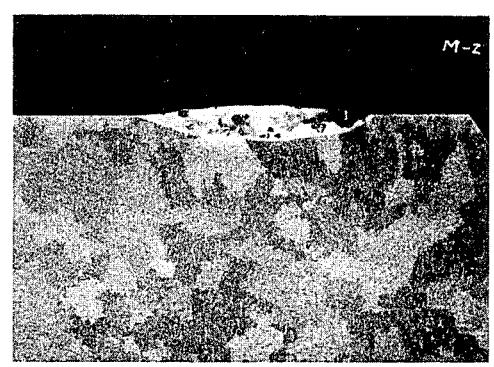
FIG. 10, similarly to FIG. 9 for the first one of said first preferred embodiment set, is a transverse cross sectional photomicrograph taken at a magnification of 10×, showing said bead produced according to said second one of said first set of preferred embodiments of the present invention.

FIGS. 5 through 8 and plan views showing the bead portions 8 (i.e., the alloy layers) formed in each of the four cases described above, by employing the allow materials "A", "B", "C", and "D" respectively; thus, FIGS. 5 and 6 were made according to the two preferred embodiments included in the first set of preferred embodiments of the alloy layer forming method of the present invention, by utilizing silicon powder mixed in with the stellite alloy material powder, while FIGS. 7 and 8 were made by comparison methods not according to the present invention. Further, FIGS. 9 and 10 are cross sectional photomicrograph views at enlargements of 10× taken transversely through the bead portions 8 produced by said first set of preferred embodiments of the present invention alloy layer forming method utilizing the alloy materials "A" and "B", respectively. In the case of the first one of said first set of preferred embodiments of the present invention which utilized the powder alloy material "A", the alloy layer bead portion 8 was about 1.8 mm by about 4.2 mm in cross sectional dimensions, had surface hardness about 350 to 450, and had good surface appearance; in the case of the second one of said first set of preferred embodiments of the present invention which utilized the powder alloy material "B", the alloy layer bead portion 8 was about 1.6 mm by about 4.0 mm in cross sectional dimensions, had surface hardness about 150 to 200, and likewise had good surface appearance; in the case of the first comparison method which utilized the powder alloy material "C" which contained only stellite powder but contained substantially no silicon powder, the alloy layer bean portion 8 was not properly formed, insofar as it could be determined had surface hardness about 85 to 95, and the surface appearance of the general area thereof was poor; and similarly, for the case of the second comparison method which utilized the strip alloy material "D" made of D-6k alloy, the alloy layer head portion 8 was not properly formed, insofar as it could be determined had a similar surface hardness about 85 to 95, and again the surface appearance of the general area thereof was poor.

From the plan views of FIGS. 5 and 6 and the sectional views of FIGS. 9 and 10, it will be understood that, when surface alloying is performed according to either of the preferred embodiments of this first preferred embodiment set (utilizing alloy materials "A" or "B" containing mixed stellite powder and silicon powder), the external appearance and tidyness of the bead 8 is of good quality, and an alloy layer with no substantial defects such as blow holes can be formed on the surface of the aluminum alloy substrate block. In FIGS. 9 and 10, the portions showing up as black areas in the alloy layer are agglomerations of metallic compounds formed between the silicon and the alloy elements included in the stellite alloy powder.

On the other hand, from the plan view of FIG. 7 it will be understood that, when surface alloying was performed according to the first comparison method by utilizing as alloy material only stellite powder without any admixture of silicon powder (alloy material "C"), the alloy material was not properly fused on the surface of the aluminum alloy substrate block, and the surface of said substrate block was not fused either, so that a proper surface alloy layer was not formed at all. And, similarly, from the plan view of FIG. 8 it will be understood that, when surface alloying was performed according to the second comparison method by utilizing as alloy material only solid alloy D-6k without any admixture of silicon (alloy material "D"), the alloy material was only partially fused on the surface of the aluminum alloy substrate block, and the surface of said substrate block was not properly fused, so that a proper surface alloy layer was not formed, and large holes were everywhere generated in the bead portion 8.

A central portion of the bead portion 8 illustrated in FIGS. 5 and 9, made using the alloy powder material "A", was analyzed; and the composition thereof was found to be approximately 8% chromium, approximately 1.0% tungsten, approximately 2.0% nickel, approximately 20% silicon, approximately 0.05% boron, approximately 0.05% carbon, approximately 4% cobalt, and remainder substantially aluminum. Similarly, a central portion of the bead portion 8 illustrated in FIGS. 6 and 10, made using the alloy powder material "B", was analyzed; and the composition thereof was found to be approximately 10% chromium, approximately 1.0% tungsten, approximately 4.0% nickel, approximately 25% silicon, approximately 0.1% boron, approximately 0.1% carbon, approximately 10% cobalt, and remainder substantially aluminum.

The second preferred embodiment (Powdered alloy of silicon and copper)

Figure 11:
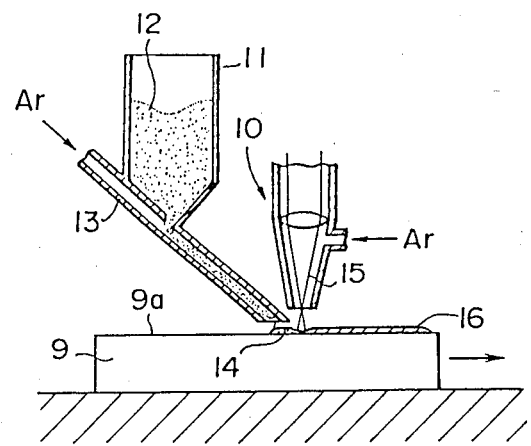
FIG. 11, similarly to FIG. 3 for the first set of preferred embodiments, is a side view showing the laser fusing step performed during the practice of the second preferred embodiment of the method for forming an alloy layer on a substrate of the present invention.

The laser fusing step performed during the practice of the second preferred embodiment of the method for forming an alloy layer on a substrate of the present invention is shown in side view in FIG. 11, in a similar manner to FIG. 3 relating to the first preferred embodiment. In detail, this second preferred embodiment was performed as follows. Initially, a quantity of alloy powder was produced by powdering to approximately −100 mesh a quantity of silicon-copper alloy (composition approximately 80% copper, and remainder substantially silicon). Next, a substrate material test sample piece 9 was prepared, of substantially the same dimensions of approximately 70 mm×40 mm×10 mm as in the case of the first set of preferred embodiments, and being made of substantially the same type of aluminum alloy of JIS (Japanese Industrial Standard) ADC-10.

Next, as shown in side view in FIG. 11, a $CO_2$ laser gun 10 was scanned in one pass along this substrate aluminum alloy block 9, from one end thereof to the other along the central portion of a 70×40 mm face 9a thereof and parallel to the 70 mm long sides of said face 9a, while simultaneously a stream of argon gas was emitted from the end of said laser gun 10, said argon gas stream acting as a shield gas; and, further, onto said upper face 9a of said alloy block 9 just into the path of said laser gun 10 and before it there was fed a steady stream of the above described alloy powder, a mass 12 of which was held in a hopper 11 a lower portion of which opened into an intermediate position along a downwardly sloping pipe 13 from which said alloy powder stream thus sifted and emerged, along with another admixture stream of argon gas which further was fed through said pipe 13 as a carrier gas. The laser gun 10 was at this time operated so as to emit laser radiation, denoted in FIG. 11 as 15, and this process caused local heating of the upper surface of the alloy block 9 and of the alloy powder just laid thereon, for fusingly alloying and melting thereof into a molten alloy layer 14 in the path of under and behind the laser gun 10, and said molten alloy layer hardened into a bead 16 trailing behind the laser gun 10. As before: the laser gun output was about 2.0 kilowatts; the output mode was multi mode; the beam pattern was elliptical, with the long diameter about 5 mm and the short diameter about 3.5 mm; the laser gun scanning speed was about 300 mm per minute; and the flow rate of the argon shield gas was about 35 liters per minute. Thus a bead portion 16 of fused and melted together alloy powder material and substrate aluminum alloy material was formed along the 70 mm×40 mm surface 9a of the substrate material block 9, parallel to and midway between the long sides thereof. During this process, the molten portion 14 was cooled rapidly to form said hardened bead portion 16, principally by absorption of the heat in said bead portion 14 by the main body of the substrate material block 9.

Figure 12:
FIG. 12, similarly to FIGS. 9 and 10 for the first set of preferred embodiments, is a transverse cross sectional photomicrograph taken at a magnification of 10×, showing the bead produced according to said second preferred embodiment of the present invention.

FIG. 12 is a cross sectional optical photomicrograph view at an enlargement of 10× taken transversely through the bead portion 16 produced by said second preferred embodiment of the present invention alloy layer forming method. In this case, the alloy layer bead portion 16 was about 5.2 mm by about 1.5 mm in cross sectional dimensions (width and depth respectively), had surface hardness (Hv=about 5 kg) of about 200 to 230, and had good surface appearance. From this sectional view, it will be understood that, if surface alloying is performed according to this second preferred embodiment, the external appearance and tidyness of the bead 16 is of good quality, and an alloy layer with no substantial defects such as blow holes can be formed on the surface of the aluminum alloy substrate block 9. It should be noted that in FIG. 12 the portions showing up as black islands or specks of black color in the alloy layer are agglomerations of metallic compounds formed between copper and silicon. A central portion of the bead portion 16 illustrated in FIG. 12 was analyzed; and the composition thereof was found to be approximately 45% copper, approximately 8% silicon, and remainder substantially aluminum.

The third preferred embodiment (Powdered alloy of silicon and nickel)

The third preferred embodiment of the method for forming an alloy layer on a substrate of the present invention was performed as follows. Initially, a quantity of alloy powder was produced by powdering to approximately −100 mesh a quantity of silicon-nickel alloy (composition approximately 20% nickel, and remainder substantially silicon). And a substrate material test sample piece was prepared, of substantially the same dimensions of approximately 70 mm×40 mm×10 mm as in the case of the first set of preferred embodiments and the second preferred embodiment, and again being made substantially the same type of aluminum alloy of JIS (Japanese Industrial Standard) ADC-10.

Next, an alloy layer bead was formed in substantially the same manner as in the second preferred embodiment disclosed above, i.e. by scanning a $CO_2$ laser gun in one pass along an upper face of this substrate aluminum alloy block while simultaneously feeding a steady stream of the above described alloy powder onto said upper face of said alloy block just into the path of said laser gun, with the laser gun being operated so as to emit laser radiation and so as to cause local heating of the upper surface of the alloy block and of the alloy powder just laid thereon for fusingly alloying and melting thereof into a molten alloy layer in the path of under and behind the laser gun, said molten alloy layer hardening into a bead trailing behind the laser gun. And the parameters of this laser fusing process were substantially as in the case of the second preferred embodiment described above.

Figure 13:
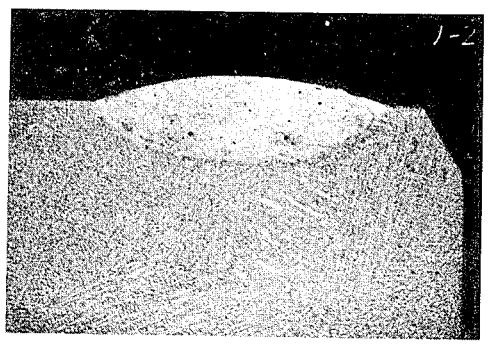
FIG. 13, similarly to FIGS. 9 and 10 for the first set of preferred embodiments and FIG. 12 for the second preferred embodiment, is a transverse cross sectional photomicrograph taken at a magnification of 10×, showing the bead produced according to a third preferred embodiment of the present invention.

FIG. 13 is a cross sectional optical photomicrograph view at an enlargement of 10× taken transversely through the bead portion produced by this third preferred embodiment of the present invention alloy layer forming method. In this case, the alloy layer bead portion was about 5.0 mm by about 1.4 mm in cross sectional dimensions (width and depth respectively), had surface hardness (Hv=about 5 kg) of about 280 to 300, and again in this case said alloy layer bead portion had good surface appearance. From this sectional view, it will be understood that, in this case employing a silicon-nickel alloy powder material also with surface alloying being performed according to this third preferred embodiment, the external appearance and tidyness of the bead is of good quality, and again an alloy layer with no substantial defects such as blow holes can be formed on the surface of the aluminum alloy substrate block. It should be noted that in FIG. 13 the portions showing up as specks of black color in the alloy layer are agglomerations of metallic compounds formed between nickel and silicon. A central portion of the bead portion 16 illustrated in FIG. 13 was analyzed; and the composition thereof was found to be approximately 7% to approximately 8% nickel, approximately 30% silicon, and remainder substantially aluminum.

The fourth set of preferred embodiments (Powdered stellite alloy mixed with powdered silicon)

The fourth set of preferred embodiments of the method for forming an alloy layer on a substrate of the present invention were performed as follows. Initially, a set of seven quantities of alloy powder was produced by combining together in seven different weight ratios quantities of silicon powder the same as used in the first set of preferred embodiments (of average particle size approximately −250 mesh) and quantities of stellite alloy powder also the same as used in said first set of preferred embodiments. The silicon contents of these seven alloy powder quantities were respectively approximately 1.0%, approximately 11%, approximately 31%, approximately 50%, approximately 71%, approximately 91%, and approximately 98%. And seven substrate material test sample pieces were prepared, each of substantially the same dimensions of approximately 70 mm×40 mm×10 mm as in the case of the previously described preferred embodiments, and again being made of substantially the same type of aluminum alloy of JIS (Japanese Industrial Standard) ADC-10.

Next, in each of the seven cases, an alloy layer bead was formed in substantially the same manner as in the first preferred embodiment disclosed above, i.e. by laying a strip of the particular alloy powder along along an upper face of one of the substrate aluminum alloy blocks, said strip being congealed together and stuck to said substrate block upper face by the use of binder and by scanning a $CO_2$ laser gun along said alloy powder strip, with the laser gun being operated so as to emit laser radiation and so as to cause local heating of the upper surface of the alloy block and of the alloy powder strip laid thereon for fusingly alloying and melting thereof into a molten alloy layer in the path of under and behind the laser gun, said molten alloy layer hardening into a bead trailing behind the laser gun. And the parameters of this laser fusing process were substantially as in the case of the first preferred embodiment described above.

The alloying rate A (in percent) for each of the seven cases was then determined according to the following formula:

$$A = (W1 - W0)/Wa \times 100$$

where: A is the alloying rate; W0 is the weight of the substrate aluminum alloy block alone, before alloying; W1 is the weight of the combination piece after the performance of the alloy layer forming method as described above, with sputter and the like removed; and Wa is the overall weight of the alloy powder quantity disposed on the surface of the substrate aluminum alloy block.

Figure 14:
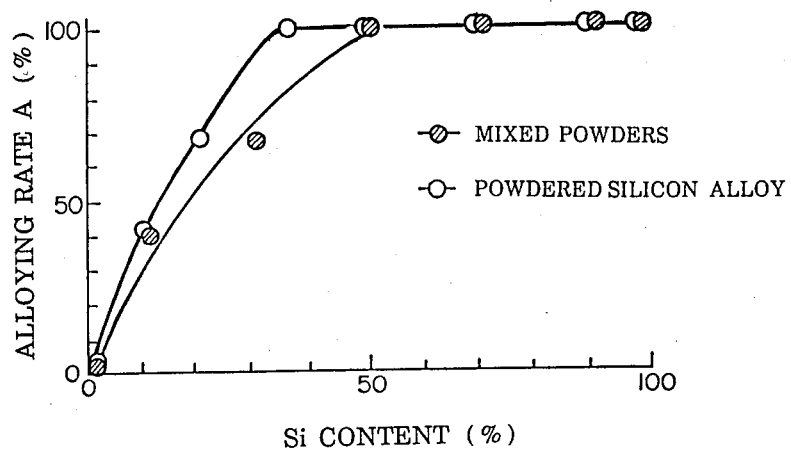
FIG. 14 is a graph in which results relating to the fourth set of preferred embodiments of the present invention are shown by dark spots and results relating to the fifth set of preferred embodiments are shown by light spots, and in which, for each case, silicon content in percent of the alloy power is shown along the horizontal axis and an alloying rate A in percent is shown along the vertical axis.

The results of these tests are shown by the seven dark spots and the line drawn with reference thereto in FIG. 14, which is a graph in which silicon content in percent of the alloy powder is shown along the horizontal axis and the above defined alloying rate A in percent is shown along the vertical axis. From this graph it will be understood that, in this case that as alloy powder is used a mixture of a silicon powder and a stellite alloy powder, it is preferable for the silicon content of the alloy powder to be at least 18%; that particularly, in this case, in order for the method according to the present invention to form properly an appropriate alloy layer said alloy powder silicon content should be at least 35%; and that even more preferably said silicon content should be at least 42%.

The fifth set of preferred embodiments (Powdered alloy of silicon and stellite alloy)

The fifth set of preferred embodiments of the method for forming an alloy layer on a substrate of the present invention were performed as follows. Initially, a set of eight quantities of alloy powder was produced by combining together in eight different weight ratios quantities of silicon and quantities of stellite alloy, by fusing said silicon and stellite alloy together so as to alloy them together, and then by powdering the resulting alloy to an average particle size of approximately −100 mesh. The silicon contents of these eight alloy powder quantities were respectively approximately 2%, approximately 10%, approximately 21%, approximately 37%, approximately 49%, approximately 69%, approximately 89%, and approximately 97%. And eight substrate material test sample pieces were prepared, each of substantially the same dimensions of approximately 70 mm×40 mm×10 mm as in the case of the previously described preferred embodiments, and again being made of substantially the same type of aluminum alloy of JIS (Japanese Industrial Standard) ADC-10.

Next, in each of the eight cases, an alloy layer bead was formed in substantially the same manner as in the first preferred embodiment disclosed above, i.e. by laying a strip of the particular alloy powder along along an upper face of one of the substrate aluminum alloy blocks, said strip being congealed together and stuck to said substrate block upper face by the use of binder and by scanning a $CO_2$ laser gun along said alloy powder strip, with the laser gun being operated so as to emit laser radiation and so as to cause local heating of the upper surface of the alloy block and of the alloy powder strip laid thereon for fusingly alloying and melting thereof into a molten alloy layer in the path of under and behind the laser gun, said molten alloy layer hardening into a bead trailing behind the laser gun. And the parameters of this laser fusing process were substantially as in the case of the first preferred embodiment described above. The alloying rate A (in percent) for each of the eight cases was then determined according to the formula described above.

The results of these tests are shown by the eight light spots and the line drawn with reference thereto in the FIG. 14 graph. From this graph it will be understood that, in this case that as alloy powder is used a powdered form of a fused alloy of silicon and a stellite alloy, it is preferable for the silicon content of the alloy powder to be at least 13%; that particularly, in this case, in order for the method according to the present invention to form properly an appropriate alloy layer said alloy powder silicon content should be at least 26%; and that even more preferably said silicon content should be at least 30%.

The sixth set of preferred embodiments (Powdered copper mixed with powdered silicon)

The sixth set of preferred embodiments of the method for forming an alloy layer on a substrate of the present invention were performed as follows. Initially, a set of eight quantities of alloy powder was produced by combining together in eight different weight ratios quantities of silicon powder the same as used in the first set of preferred embodiments (of average particle size approximately −250 mesh) and quantities of copper alloy powder having an average particle size approximately −100 mesh. The silicon contents of these eight alloy powder quantities were respectively approximately 2%, approximately 16%, approximately 27%, approximately 36%, approximately 55%, approximately 70%, approximately 91%, and approximately 99%. And eight substrate material test sample pieces were prepared, each of substantially the same dimensions of approximately 70 mm×40 mm×10 mm as in the case of the previously described preferred embodiments, and again being made of substantially the same type of aluminum alloy of JIS (Japanese Industrial Standard) ADC-10. And, in each of the eight cases, an alloy layer bead was formed in substantially the same manner as in the first preferred embodiment disclosed above, i.e. by laying a strip of the particular alloy powder along an upper face of one of the substrate aluminum alloy blocks, said strip being congealed together and stuck to said substrate block upper face by the use of binder and by scanning a $CO_2$ laser gun along said alloy powder strip, with the laser gun being operated so as to emit laser radiation and so as to cause local heating of the upper surface of the alloy block and of the alloy powder strip laid thereon for fusingly alloying and melting thereof into a molten alloy layer in the path of under and behind the laser gun, said molten alloy layer hardening into a bead trailing behind the laser gun. And the parameters of this laser fusing process were substantially as in the case of the first preferred embodiment described above. The alloying rate A (in percent) for each of the eight cases was determined according to the formula described above.

Figure 15:
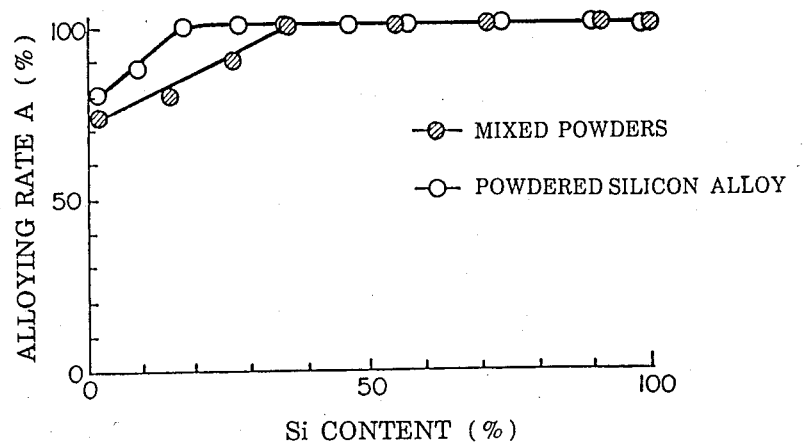
FIG. 15, similarly to FIG. 14 for the fourth and fifth sets of preferred embodiments, is a graph in which results relating to the sixth set of preferred embodiments of the present invention are shown by dark spots and results relating to the seventh set of preferred embodiments are shown by light spots, and in which, for each case, silicon content in percent of the alloy powder is shown along the horizontal axis and the alloying rate A in percent is shown along the vertical axis.

The results of these tests are shown by the eight dark spots and the line drawn with reference thereto in FIG. 15, which is a graph similar to the FIG. 14 graph for the fourth and the fifth sets of preferred embodiments and relating to this sixth preferred embodiment set and to the seventh preferred embodiment set to be described shortly, in which again silicon content in percent of the alloy powder is shown along the horizontal axis and the above defined alloying rate A in percent is shown along the vertical axis. From this graph it will be understood that, in this case that as alloy powder is used a mixture of a silicon powder and a copper powder, it is preferable for the silicon content of the alloy powder to be at least 11%; and that particularly said silicon content should preferably be at least 25%.

The seventh set of preferred embodiments (Powdered alloy of silicon and copper)

The seventh set of preferred embodiments of the method for forming an alloy layer on a substrate of the present invention were performed as follows. Initially, a set of ten quantities of alloy powder was produced by combining together in ten different weight ratios quantities of silicon and quantities of copper, by fusing said silicon and copper together so as to alloy them together, and then by powdering the resulting alloy to an average particle size of approximately −100 mesh. The silicon contents of these ten alloy powder quantities were respectively approximately 2%, approximately 9%, approximately 18%, approximately 28%, approximately 35%, approximately 47%, approximately 57%, approximately 73%, approximately 89%, and approximately 98%. And ten substrate material test sample pieces were prepared, each again of substantially the same dimensions of approximately 70 mm×40 mm×10 mm as in the case of the previously described preferred embodiments, and again being made of substantially the same type of aluminum alloy of JIS (Japanese Industrial Standard) ADC-10. And, in each of the ten cases, an alloy layer bead was formed in substantially the same manner as in the first preferred embodiment disclosed above, i.e. by laying a strip of the particular alloy powder along along an upper face of one of the substrate aluminum alloy blocks, said strip being congealed together and stuck to said substrate block upper face by the use of binder and by scanning a $CO_2$ laser gun along said alloy powder strip, with the laser gun being operated so as to emit laser radiation and so as to cause local heating of the upper surface of the alloy block and of the alloy powder strip laid thereon for fusingly alloying and melting thereof into a molten alloy layer in the path of under and behind the laser gun, said molten alloy layer hardening into a bead trailing behind the laser gun. And the parameters of this laser fusing process were substantially as in the case of the first preferred embodiment described above. The alloying rate A (in percent) for each of the ten cases was then determined according to the formula described above.

The results of these tests are shown by the ten light spots and the line drawn with reference thereto in the FIG. 15 graph. From this graph it will be understood that, in this case that as alloy powder is used a powdered form of a fused alloy of silicon and copper, it is preferable for the silicon content of the alloy powder to be at least 2%; and that particularly, in this case, in order for the method according to the present invention to form properly an appropriate alloy layer, said alloy powder silicon content should be at least 10%.

Comment on the sixth and seventh sets of embodiments

It should be noted that, in these last two detailed cases in which as alloy powder was used either a mixture of a silicon powder and a copper powder or a powdered form of a fused alloy of silicon and copper, even when the content of silicon in the alloy powder was relatively low, the alloying rate was 100% or a high value relatively close to 100%; and it is surmised that this is due to the high solid solubility of copper in aluminum alloy.

The eighth set of preferred embodiments (Powdered nickel mixed with powdered silicon)

The eighth set of preferred embodiments of the method for forming an alloy layer on a substrate of the present invention were performed as follows. Initially, a set of seven quantities of alloy powder was produced by combining together in seven different weight ratios quantities of silicon powder the same as used in the first set of preferred embodiments (of average particle size approximately −250 mesh) and quantities of nickel alloy powder having an average particle size approximately −100 mesh. The silicon contents of these seven alloy powder quantities were respectively approximately 2%, approximately 11%, approximately 28%, approximately 50%, approximately 72%, approximately 90%, and approximately 99%. And seven substrate material test sample pieces were prepared, each of substantially the same dimensions of approximately 70 mm×40 mm×10 mm as in the case of the previously described preferred embodiments, and again being made of substantially the same type of aluminum alloy of JIS (Japanese Industrial Standard) ADC-10. And, in each of the seven cases, an alloy layer bead was formed in substantially the same manner as in the first preferred embodiment disclosed above, i.e. by laying a strip of the particular alloy powder along along an upper face of one of the substrate aluminum alloy blocks, said strip being congealed together and stuck to said substrate block upper face by the use of binder and by scanning a $CO_2$ laser gun along said alloy powder strip, with the laser gun being operated so as to emit laser radiation and so as to cause local heating of the upper surface of the alloy block and of the alloy powder strip laid thereon for fusingly alloying and melting thereof into a molten alloy layer in the path of under and behind the laser gun, said molten alloy layer hardening into a bead trailing behind the laser gun. And the parameters of this laser fusing process were substantially as in the case of the first preferred embodiment described above. The alloying rate A (in percent) for each of the seven cases was again determined according to the formula described above.

The results of these tests are shown by the seven dark spots and the line drawn with reference thereto in FIG.

16, which is a graph similar to the FIG. 14 and FIG. 15 graphs for the fourth through the seventh sets of preferred embodiments and relating to this eighth preferred embodiment set and to the ninth preferred embodiment set to be described shortly, in which again silicon content in percent of the alloy powder is shown aoong the horizontal axis and the above defined alloying rate A in percent is shown along the vertical axis. From this graph it will be understood that, in this case that as alloy powder is used a mixture of a silicon powder and a nickel powder, it is preferable for the silicon content of the alloy powder to be at least 18%; that particularly, in this case, in order for the method according to the present invention to form properly an appropriate alloy layer said alloy powder silicon content should be at least 35%; and that even more preferably said silicon content should be at least 42%.

The ninth set of preferred embodiments (Powdered alloy of silicon and nickel)

The ninth set of preferred embodiments of the method for forming an alloy layer on a substrate of the present invention were performed as follows. Initially, a set of eight quantities of alloy powder was produced by combining together in eight different weight ratios quantities of silicon and quantities of nickel, by fusing said silicon and nickel together so as to alloy them together, and then by powdering the resulting alloy to an average particle size of approximately −100 mesh. The silicon contents of these eight alloy powder quantities were respectively approximately 2%, approximately 9%, approximately 20%, approximately 33%, approximately 50%, approximately 71%, approximately 90%, and approximately 98%. And eight substrate material test sample pieces were prepared, each again of substantially the same dimensions of approximately 70 mm×40 mm×10 mm as in the case of the previously described preferred embodiments, and again being made of substantially the same type of aluminum alloy of JIS (Japanese Industrial Standard) ADC-10. And, in each of the eight cases, an alloy layer bead was formed in substantially the same manner as in the first preferred embodiment disclosed above, i.e. by laying a strip of the particular alloy powder along along an upper face of one of the substrate aluminum alloy blocks, said strip being congealed together and stuck to said substrate block upper face by the use of binder and by scanning a $CO_2$ laser gun along said alloy powder strip, with the laser gun being operated so as to emit laser radiation and so as to cause local heating of the upper surface of the alloy block and of the alloy powder strip laid thereon for fusingly alloying and melting thereof into a molten alloy layer in the path of under and behind the laser gun, said molten alloy layer hardening into a bead trailing behind the laser gun. And the parameters of this laser fusing process were substantially as in the case of the first preferred embodiment described above. The alloying rate A (in percent) for each of the eight cases was then determined according to the formula described above.

Figure 16:
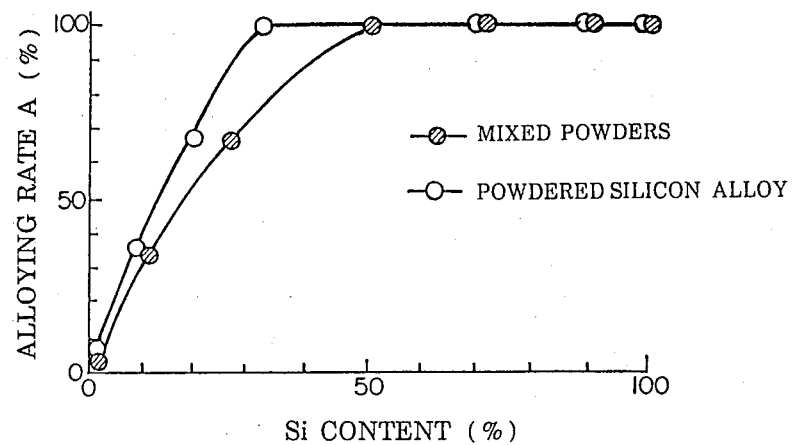
FIG. 16, similarly to FIG. 14 for the fourth and fifth sets of preferred embodiments and FIG. 15 for the sixth and seventh sets of preferred embodiments, is a graph in which results relating to the eighth set of preferred embodiments are shown by dark spots and results relating to the ninth set of preferred embodiments are shown by light spots, and in which, for each case, silicon content in percent of the alloy powder is shown along the horizontal axis and the alloying rate A in percent is shown along the vertical axis.

The results of these tests are shown by the eight light spots and the line drawn with reference thereto in the FIG. 16 graph. From this graph it will be understood that, in this case that as alloy powder is used a powdered form of a fused alloy of silicon and nickel, it is preferable for the silicon content of the alloy powder to be at least 13%; that particularly, in this case, in order for the method according to the present invention to form properly an appropriate alloy layer said alloy powder silicon content should be at least 24%; and that even more preferably said silicon content should be at least 28%.

Comment on the fourth through the ninth sets of embodiments

From the fourth through the ninth sets of preferred embodiments described above, as a summary, it will be understood that: in the case that as alloy powder is used a powder mixture of a silicon powder and a powder of an element to be alloyed with the aluminum alloy substrate block, it is preferable for the silicon content of the alloy powder to be at least 18%, more preferably at least 35%, and even more preferably at least 42%; while, in the alternative case that as alloy powder is used a powdered form of a fused alloy of silicon and said element to be alloyed with said aluminum alloy substrate block, it is preferable for the silicon content of the alloy powder to be at least 13%, more preferably at least 26%, and even more preferably at least 30%.

The tenth set of preferred embodiments (Powdered nickel mixed with powdered silicon)
(Effect of variation of silicon powder particle size)

The tenth set of preferred embodiments of the method for forming an alloy layer on a substrate of the present invention were performed as follows. Initially, a set of nine quantities of alloy power was produced by combining together, in each case in a weight ratio of approximately 1:1, quantities of stellite alloy powder of the type used in the first set of preferred embodiments described above and having an average particle size approximately −100 mesh, and quantities of silicon powder of nine different average particle sizes, to wit: approximately −35 mesh, approximately −5 mesh, approximately −10 mesh, approximately −16 mesh, approximately −24 mesh, approximately −50 mesh, approximately −150 mesh, approximately −250 mesh, and approximately −325 mesh. And nine substrate material test sample pieces were prepared, each of substantially the same dimensions of approximately 70 mm×40 mm×10 mm as in the case of the previously described preferred embodiments, and again being made of substantially the same type of aluminum alloy of JIS (Japanese Industrial Standard) ADC-10. And, in each of the nine cases, an alloy layer bead was formed in substantially the same manner as in the first preferred embodiment disclosed above, i.e. by laying a strip of the particular alloy powder along along an upper face of one of the substrate aluminum alloy blocks, said strip being congealed together and stuck to said substrate block upper face by the use of binder and by scanning a $CO_2$ laser gun along said alloy powder strip, with the laser gun being operated so as to emit laser radiation and so as to cause local heating of the upper surface of the alloy block and of the alloy powder strip laid thereon for fusingly alloying and melting thereof into a molten alloy layer in the path of under and behind the laser gun, said molten alloy layer hardening into a bead trailing behind the laser gun. And the parameters of this laser fusing process were substantially as in the case of the first preferred embodiment described above. The alloying rate A (in percent) for each of the nine cases was again determined according to the formula described above.

Figure 17:
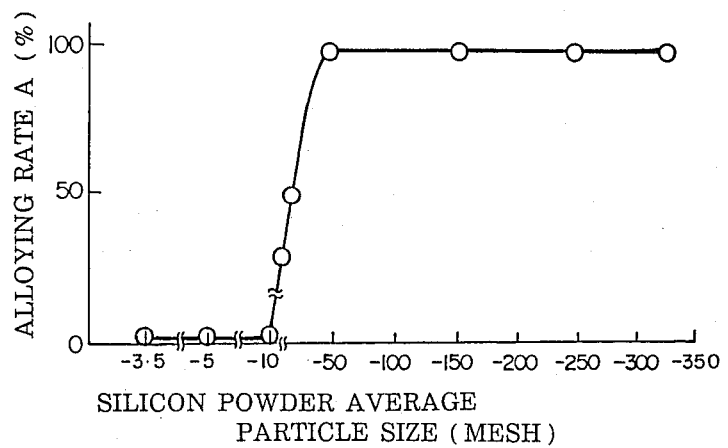
FIG. 17 is a graph relating to the tenth set of preferred embodiments of the present invention, in which, for each of various cases, average particle size in mesh of the silicon powder included in the alloy powder is shown along the horizontal axis and the alloying rate A in percent is shown along the vertical axis.

The results of these tests are shown by the nine spots and the line drawn with reference thereto in FIG. 17, which is a graph relating to this tenth preferred embodiment set in which average particle size in mesh of the alloy powder is shown along the horizontal axis and the above defined alloying rate A in percent is shown along the vertical axis. From this graph it will be understood that, in this case that as alloy powder is used a mixture of a silicon powder and a stellite powder, it is preferable for the average particle size of the silicon powder included in the alloy powder to be no more than about −24 mesh, more preferably no more than about −32 mesh, and even more preferably no more than about −42 mesh. And it should be noted that, in the cases that the average particle size of the silicon powder included in the alloy powder was greater than or equal to about −10 mesh, it was not possible satisfactorily to dispose the alloying powder on the surface of the substrate aluminum alloy blocks.

Figure 18:
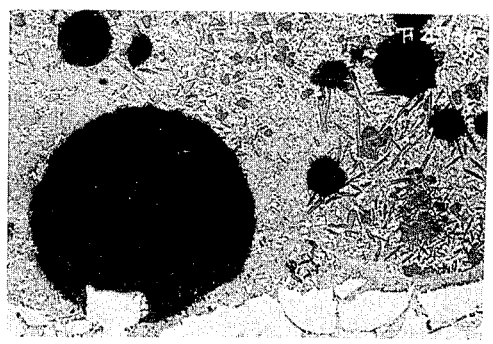
FIG. 18 is a transverse cross sectional photomicrograph taken at a magnification of 100×, showing the bead produced according to a first one of said tenth set of preferred embodiments of the present invention, in which the average particle size in mesh of the silicon powder included in the alloy powder was about −16 mesh.
Figure 19:
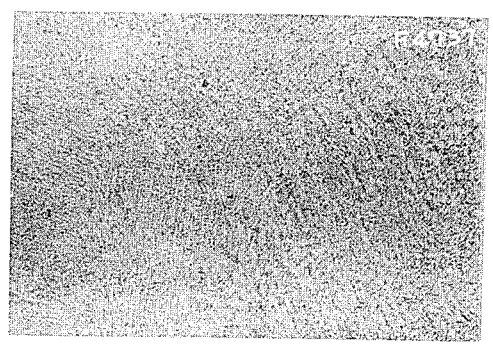
FIG. 19, similarly to FIG. 18 for the first one of said tenth preferred embodiment set, is a transverse cross sectional photomicrograph taken at a magnification of 100×, showing the bead produced according to a second one of said tenth set of preferred embodiments of the present invention, in which the average particle size in mesh of the silicon powder included in the alloy powder was about −325 mesh.

FIGS. 18 and 19 are cross sectional optical photomicrograph views at enlargements of 100× taken transversely through the bead portions produced by those two ones of this tenth set of preferred embodiments of the present invention alloy layer forming method in which the average size of the silicon powder included in the alloy powder was about −16 mesh, and was about −325 mesh, respectively. In the FIG. 18 case that the average size of the silicon powder included in the alloy powder was about −16 mesh, from this sectional view it will be understood that, if surface alloying is performed according to this one of the tenth set of preferred embodiments, the alloy layer had a large number of defects such as blow holes, and was not satisfactory; this is thought to have been due to inclusion of gas in the alloy layer. On the other hand, in the FIG. 19 case that the average size of the silicon powder included in the alloy powder was about −325 mesh, from this sectional view it will be understood that, if surface alloying is performed according to this one of the tenth set of preferred embodiments, the alloy layer had no substantial defects such as blow holes, and had a satisfactory and substantially uniform composition.

Further variant embodiments

As a variant set of preferred embodiments of the present invention, another set of nine quantities of alloy powder was produced by using quantities of a silicon-copper alloy (composition about 50% silicon, remainder substantially copper) which had been ground into powder of nine different average particle sizes (unit mesh), to wit: approximately −3.5 mesh, approximately −5 mesh, approximately −10 mesh, approximately −16 mesh, approximately −24 mesh, approximately −50 mesh, approximately −150 mesh, approximately −250 mesh, and approximately −325 mesh. And nine substrate material test sample pieces were prepared, each of substantially the same dimensions of approximately 70 mm×40 mm×10 mm as in the case of the previously described preferred embodiments, and again being made of substantially the same type of aluminum alloy of JIS (Japanese Industrial Standard) ADC-10. And, in each of the nine cases, an alloy layer bead was formed in substantially the same manner as in the first preferred embodiment disclosed above, the parameters of this laser fusing process being substantially as in the case of said first preferred embodiment. The alloying rate A (in percent) for each of the nine cases was again determined according to the formula described above; and the results of these tests were found to be generally similar to those detailed above with regard to the tenth preferred embodiment and shown in FIG. 17.

The Second Class of Preferred Embodiments, Utilizing Bismuth

In the second class of preferred embodiments which will be described, which again incorporates ten subclasses or sets thereof, bismuth powder is used for admixture with the alloy material. This is the second of the two materials that have been found by the present inventors to be suitable for this application.

The eleventh set of preferred embodiments, with comparison samples (Powdered stellite alloy mixed with powdered bismuth)

Successive stages of the general method of practice of the eleventh set of preferred embodiments of the alloy layer on substrate forming method of the present invention will now be described; FIGS. 1 through 4 can serve for describing said stages of said eleventh preferred embodiment set, since said eleventh preferred embodiment set does not differ in outward appearance from the first preferred embodiment set, but only by the materials utilized and by certain process parameters.

Initially, a first quantity designated as "A" of alloy powder was produced by evenly combining together in a weight ratio of approximately 1:1 a quantity of bismuth powder of average particle size approximately −100 mesh and a quantity of stellite alloy powder (composition approximately 24% approximately 0.5% silicon, approximately 0.1% boron, not more than 0.4% carbon, and remainder substantially cobalt) of average particle size approximately −100 mesh. Similarly, a second quantity designated as "B" of alloy powder was produced by evenly combining together in a weight ratio of approximately 1:1 a quantity of bismuth powder of average particle size approximately −250 mesh and a quantity of similarly composed stellite alloy powder of average particle size approximately −100 mesh. These alloy powder quantities "A" and "B" were, as will be seen, constituted so as to be suitable for practice of the two preferred embodiments of the method of the present invention included in the eleventh set thereof. And for the practice of a comparison method, not according to the present invention, there was produced a quantity designated as "C" of a third powder, being similarly composed stellite powder only, of average particle size approximately −100 mesh. And, next, to each of these powders for alloying there was added a quantity of 5% aqueous solution of polyvinyl alcohol, to serve as a binder, and thus in each of the three cases there was formed a paste with a viscosity higher than that of water and lower than that of clay.

Next, four substrate material test sample pieces 1 of the same type as described before were prepared, each being a cuboidal block with dimensions approximately 70 mm×40 mm×10 mm, and being made of aluminum alloy of JIS (Japanese Industrial Standard) ADC-10. And, as shown in the side perspective view of FIG. 1 which shows the first stage of practice of these eleventh set of preferred embodiments, on each of the 70 mm×40 mm surfaces denoted as 1a of three of these four aluminum alloy substrate material pieces 1 there were laid two guide plates 2 and 3 of suitable material, of thickness about 1 mm, with their longer edges parallel to and confronting one another and separated by about 5 mm. And then, for each of these three assemblies, a quantity designated as 4 of one of the above described three pastes made from the alloy powder quantities "A", "B", and "C" was packed into the gap between said two guide plates 2 and 3, with the top of said quantity 4 of paste leveled off.

In the next stage, not particularly shown in any figure, each of the assemblies as shown in FIG. 1 was heated to a temperature of about 100 C. in a drying oven and was maintained at said temperature for about one hour; thus in each case the alloy powder paste quantity 4 was thoroughly dried. Then, in each case, the two guide plates 2 and 3 were removed, to leave as shown in FIG. 2 in perspective view the block 1 of aluminum alloy substrate material with a strip layer 5 of the corresponding alloy powder laid along its 70 mm×40 mm surface 1a parallel to and midway between the long sides thereof, said strip layer 5 being bound together and congealed to the block 1 by the hardened binder. As in the first set of preferred embodiments, in each case said strip layer 5 had width about 5 mm, thickness about 1.0 mm, and length about 60 mm. Further, on the 70 mm×40 mm surface 1a of the fourth aluminum alloy substrate material piece 1 there was laid, parallel to and midway between the long sides thereof, a strip piece designated as "D" made of so called D-6k alloy material (composition approximately 30% chromium, approximately 4.5% tungsten, approximately 1.0% carbon, and remainder substantially cobalt), of dimensions width about 5 mm, thickness about 0.5 mm, and length about 60 mm.

Next, as shown in side view in FIG. 3, a $CO_2$ laser gun 6 was scanned in one pass along each of these strips 5 of material (either congealed alloy powder or strip material) for being alloyed with the substrate aluminum alloy block 1, from one end thereof to the other, while simultaneously a stream of argon gas was emitted from the end of said laser gun 6, said argon gas stream acting as a shield gas. The laser gun 6 was at this time operated so as to emit laser radiation, denoted in FIG. 3 as 7, and this process caused local heating of the strip 5 of material for alloying, and melting thereof. The laser output was about 2.0 kilowatts; the output mode was multi mode; the beam pattern was elliptical, with the long diameter about 5 mm and the short diameter about 3.5 mm; the laser scanning speed was about 300 mm per minute; and the flow rate of the argon shield gas was about 35 liters per minute. Thus, as shown in side perspective view in FIG. 4, a bead portion 8 of fused and melted together alloy material (powder or strip) and substrate aluminum alloy material was formed along the 70 mm×40 mm surface 1a of each substrate material block 1, parallel to and midway between the long sides thereof. During this process, the molten portion was cooled rapidly, principally by absorption of the heat therein by the main body of the substrate material block 1.

Figure 20:
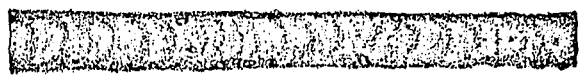
FIG. 20, similarly to FIG. 5 for the first preferred embodiment set, is a plan view showing the appearance of a bead, produced according to the first one of an eleventh set of preferred embodiments of the present invention.
Figure 21:
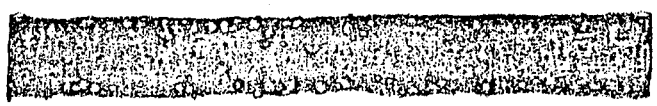
FIG. 21, similarly to FIG. 6 for the first preferred embodiment set, is a plan view showing the appearance of said bead, produced according to the second one of said eleventh set of preferred embodiments of the present invention.
Figure 22:
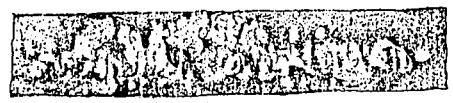
FIG. 22 is a similar plan view, showing the appearance of the said bead, produced according to another first comparison method utilized in conjunction with said eleventh preferred embodiment set, not according to the present invention.
Figure 23:
FIG. 23, similarly to FIG. 22 for that another first comparison method, is a plan view, showing the appearance of the said bead, produced according to another second comparison method utilized in conjunction with said eleventh preferred embodiment set, also not according to the present invention.
Figure 24:
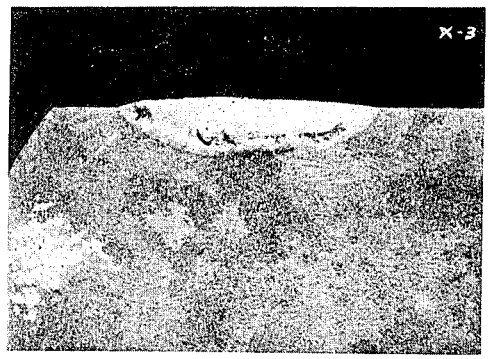
FIG. 24 is a transverse cross sectional photomicrograph taken at a magnification of 10×, showing said bead produced according to said first one of said eleventh set of preferred embodiments of the present invention.
Figure 25:
FIG. 25, similarly to FIG. 24 for the first one of said eleventh preferred embodiment set, is a transverse cross sectional photomicrograph taken at a magnification of 10×, showing said bead produced according to said second one of said eleventh set of preferred embodiments of the present invention.

FIGS. 20 through 23 are plan views showing the bead portions 8 (i.e., the alloy layers) formed in each of the four cases described above, by employing the alloy materials "A", "B", "C", and "D" respectively; thus, FIGS. 20 and 21 were made according to the two preferred embodiments included in the eleventh set of preferred embodiments of the alloy layer forming method of the present invention, by utilizing bismuth powder mixed in with the stellite alloy material powder, while FIGS. 22 and 23 were made by comparison methods not according to the present invention (which in fact correspond to the comparison methods detailed with regard to the first set of preferred embodiments detailed earlier). Further, FIGS. 24 and 25 are cross sectional photomicrograph views at enlargements of 10× taken transversely through the bead portions 8 produced by said eleventh set of preferred embodiments of the present invention alloy layer forming method utilizing the alloy materials "A" and "B", respectively. In the case of the first one of said eleventh set of preferred embodiments of the present invention which utilized the powder alloy material "A", the alloy layer bead portion 8 was about 1.8 mm by about 4.2 mm in cross sectional dimensions, had surface hardness about 350 to 450, and had good surface appearance; in the case of the second one of said eleventh set of preferred embodiments of the present invention which utilized the powder alloy material "B", the alloy layer bead portion 8 was about 1.6 mm by about 4.0 mm in cross sectional dimensions, had surface hardness about 150 to 200, and likewise had good surface appearance; in the case of the first comparison method which utilized the powder alloy material "C" which contained only stellite powder but contained substantially no bismuth powder, the alloy layer bead portion 8 was not properly formed, insofar as it could be determined had surface hardness about 85 to 95, and the surface appearance of the general area thereof was poor; and similarly, for the case of the second comparison method which utilized the strip alloy material "D" made of D-6k alloy, the alloy layer bead portion 8 was not properly formed, insofar as it could be determined had a similar surface hardness about 85 to 95, and again the surface appearance of the general area thereof was poor.

From the plan views of FIGS. 20 and 22 and the sectional views of FIGS. 24 and 25, it will be understood that, if surface alloying is performed according to either of the preferred embodiments of this first preferred embodiment set (utilizing alloy materials "A" or "B" containing mixed stellite powder and bismuth powder), the external appearance and tidyness of the bead 8 is of good quality, and an alloy layer with no substantial defects such as blow holes can be formed on the surface of the aluminum alloy substrate block. In FIGS. 24 and 25, the portions showing up as black areas in the alloy layer are agglomerations of metallic compounds formed between the bismuth and the alloy elements included in the stellite alloy powder.

On the other hand, from the plan view of FIG. 22 it will be understood that, when surface alloying was performed according to the first comparison method by utilizing as alloy material only stellite powder without any admixture of bismuth powder (alloy material "C"), the alloy material was not properly fused on the surface of the aluminum alloy substrate block, and the surface of said substrate block was not fused either, so that a proper surface alloy layer was not formed at all. And, similarly, from the plan view of FIG. 23 it will be understood that, when surface alloying was performed according to the second comparison method by utilizing as alloy material only solid alloy D-6k without any admixture of bismuth (alloy material "D"), the alloy material was only partially fused on the surface of the aluminum alloy substrate block, and the surface of said substrate block was not properly fused, so that a proper surface alloy layer was not formed, and large holes were everywhere generated in the bead portion 8.

A central portion of the bead portion 8 illustrated in FIGS. 20 and 24, made using the alloy powder material "A", was analyzed; and the composition thereof was found to be approximately 7.5% chromium, approximately 0.8% tungsten, approximately 2.0% nickel, approximately 2.5% silicon, approximately 0.05% boron, approximately 0.05% carbon, approximately 15% bismuth, approximately 3.5% cobalt, and remainder substantially aluminum. Similarly, a central portion of the bead portion 8 illustrated in FIGS. 21 and 25, made using the alloy powder material "B", was analyzed; and the composition thereof was found to be approximately 10% chromium, approximately 1.0% tungsten, approximately 3.5% nickel, approximately 3.0% silicon, approximately 0.05% boron, approximately 0.05% carbon, approximately 20% bismuth, approximately 7.5% cobalt, and remainder substantially aluminum.

The twelfth preferred embodiment (Powdered alloy of bismuth and copper)

The laser fusing step performed during the practice of the twelfth preferred embodiment of the method for forming an alloy layer on a substrate of the present invention is substantially the same as described above with reference to the second preferred embodiment and shown in side view in FIG. 11; accordingly, this FIG. 11 will be used for explanation of this twelfth preferred embodiment, also, which differs from the second preferred embodiment only in the materials used and in certain process parameters. In detail, this twelfth preferred embodiment was performed as follows. Initially, a quantity of alloy powder was produced by powdering to approximately −100 mesh a quantity of bismuth-copper alloy (composition approximately 80% copper, and remainder substantially bismuth). Next, a substrate material test sample piece 9 was prepared, of substantially the same dimensions of approximately 70 mm×40 mm×10 mm as in the case of the eleventh set of preferred embodiments, and being made of substantially the same type of aluminum alloy of JIS (Japanese Industrial Standard) ADC-10.

Next, as shown in side view in FIG. 11, a $CO_2$ laser gun 10 was scanned in one pass along this substrate aluminum alloy block 9, from one end thereof to the other along the central portion of a 70×40 mm face 9a thereof and parallel to the 70 mm long sides of said face 9a, while simultaneously a stream of argon gas was emitted from the end of said laser gun 10, said argon gas stream acting as a shield gas; and, further, onto said upper face 9a of said alloy block 9 just into the path of said laser gun 10 and before it there was fed a steady stream of the above described alloy powder, a mass 12 of which was held in a hopper 11 a lower portion of which opened into an intermediate position along a downwardly sloping pipe 13 from which said alloy powder stream thus sifted and emerged, along with another admixture stream of argon gas which further was fed through said pipe 13 as a carrier gas. The laser gun 10 was at this time operated so as to emit laser radiation, denoted in FIG. 11 as 15, and this process caused local heating of the upper surface of the alloy block 9 and of the alloy powder just laid thereon, for fusingly alloying and melting thereof into a molten alloy layer 14 in the path of under and behind the laser gun 10, and said molten alloy layer hardened into a bead 16 trailing behind the laser gun 10. As before: the laser gun output was about 2.0 kilowatts; the output mode was multi mode; the beam pattern was elliptical, with the long diameter about 5 mm and the short diameter about 3.5 mm; the laser gun scanning speed was about 300 mm per minute; and the flow rate of the argon shield gas was about 35 liters per minute. Thus a bead portion 16 of fused and melted together alloy powder material and substrate aluminum alloy material was formed along the 70 mm×40 mm surface 9a of the substrate material block 9, parallel to and midway between the long sides thereof. During this process, the molten portion 14 was cooled rapidly to form said hardened bead portion 16, principally by absorption of the heat in said bead portion 14 by the main body of the substrate material block 9.

Figure 26:
FIG. 26, similarly to FIGS. 24 and 25 for the eleventh set of preferred embodiments, is a transverse cross sectional photomicrograph taken at a magnification of 10×, showing the bead produced according to a twelfth preferred embodiment of the present invention.

FIG. 26 is a cross sectional optical photomicrograph view at an enlargement of 10× taken transversely through the bead portion 16 produced by said twelfth preferred embodiment of the present invention alloy layer forming method. In this case, the alloy layer bead portion 16 was about 5.0 mm by about 1.8 mm in cross sectional dimensions (width and depth respectively), had surface hardness (Hv=about 5 kg) of about 200 to 230, and had good surface appearance. From this sectional view, it will be understood that, if surface alloying is performed according to this twelfth preferred embodiment, the external appearance and tidyness of the bead 16 is of good quality, and an alloy layer with no substantial defects such as blow holes can be formed on the surface of the aluminum alloy substrate block 9. It should be noted that in FIG. 26 the portions showing up as black islands or specks of black color in the alloy layer are portions which are agglomerations of metallic compounds formed between copper and bismuth, while the portions which show up as dark gray are those with a relatively high concentration of bismuth. A central portion of the bead portion 16 illustrated in FIG. 26 was analyzed; and the composition thereof was found to be approximately 27.5% copper, approximately 7.5% bismuth, and remainder substantially aluminum.

The thirteenth preferred embodiment (Powdered alloy of bismuth and nickel)

The thirteenth preferred embodiment of the method for forming an alloy layer on a substrate of the present invention was performed as follows. Initially, a quantity of alloy powder was produced by powdering to approximately −48 mesh a quantity of bismuth-nickel alloy (composition approximately 20% nickel, and remainder substantially bismuth). And a substrate material test sample piece was prepared, of substantially the same dimensions of approximately 70 mm×40 mm×10 mm as in the case of the eleventh set of preferred embodiments and the twelfth preferred embodiment, and again being made of substantially the same type of aluminum alloy of JIS (Japanese Industrial Standard) ADC-10.

Next, an alloy layer bead was formed in substantially the same manner as in the twelfth preferred embodiment disclosed above, i.e. by scanning a $CO_2$ laser gun in one pass along an upper face of this substrate aluminum alloy block while simultaneously feeding a steady stream of the above described alloy powder onto said upper face of said alloy block just into the path of said laser gun, with the laser gun being operated so as to emit laser radiation and so as to cause local heating of the upper surface of the alloy block and of the alloy powder just laid thereon for fusingly alloying and melting thereof into a molten alloy layer in the path of under and behind the laser gun, said molten alloy layer hardening into a bead trailing behind the laser gun. And the parameters of this laser fusing process were substantially as in the case of the twelfth preferred embodiment described above.

Figure 27:
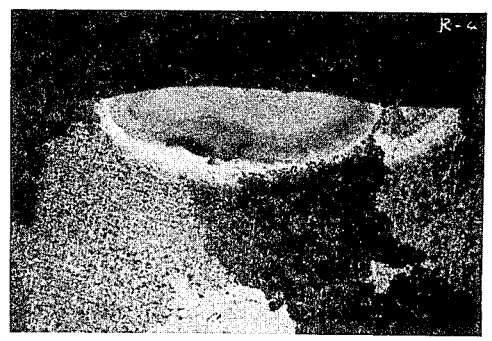
FIG. 27, similarly to FIGS. 24 and 25 for the eleventh set of preferred embodiments and FIG. 26 for the twelfth preferred embodiment, is a transverse cross sectional photomicrograph taken at a magnification of 10×, showing the bead produced according to a thirteenth preferred embodiment of the present invention.

FIG. 27 is a cross sectional optical photomicrograph view at an enlargement of 10× taken transversely through the bead portion produced by this thirteenth preferred embodiment of the present invention alloy layer forming method. In this case, the alloy layer bead portion was about 4.7 mm by about 1.2 mm in cross sectional dimensions (width and depth respectively), had surface hardness (Hv=about 5 kg) of about 270 to 300, and again in this case said alloy layer bead portion had good surface appearance. From this sectional view, it will be understood that, in this case employing a bismuth-nickel alloy powder material also with surface alloying being performed according to this thirteenth preferred embodiment, the external appearance and tidyness of the bead is of good quality, and again an alloy layer with no substantial defects such as blow holes can be formed on the surface of the aluminum alloy substrate block. It should be noted that in FIG. 27 the portions showing up as islands of black color in the alloy layer are agglomerations of metallic compounds formed between nickel and bismuth, and the dark gray portions are portions where the concentration of bismuth is relatively high. A central portion of the bead portion 16 illustrated in FIG. 27 was analyzed; and the composition thereof was found to be approximately 20% nickel, approximately 7.5% bismuth, and remainder substantially aluminum.

The fourteenth set of preferred embodiments (Powdered stellite alloy mixed with powdered bismuth)

The fourteenth set of preferred embodiments of the method for forming an alloy layer on a substrate of the present invention were performed as follows. Initially, a set of seven quantities of alloy powder was produced by combining together in seven different weight ratios quantities of bismuth powder the same as used in the eleventh set of preferred embodiments (of average particle size approximately −250 mesh) and quantities of stellite alloy powder also the same as used in said eleventh set of preferred embodiments. The bismuth contents of these seven alloy powder quantities were respectively approximately 2%, approximately 12%, approximately 31%, approximately 50%, approximately 70%, approximately 89%, and approximately 97%. And seven substrate material test sample pieces were prepared, each of substantially the same dimensions of approximately 70 mm×40 mm×10 mm as in the case of the previously described preferred embodiments, and again being made of substantially the same type of aluminum alloy of JIS (Japanese Industrial Standard) ADC-10.

Next, in each of the seven cases, an alloy layer bead was formed in substantially the same manner as in the eleventh preferred embodiment set disclosed above, i.e. by laying a strip of the particular alloy powder along along an upper face of one of the substrate aluminum alloy blocks, said strip being congealed together and stuck to said substrate block upper face by the use of binder and by scanning a $CO_2$ laser gun along said alloy powder strip, with the laser gun being operated so as to emit laser radiation and so as to cause local heating of the upper surface of the alloy block and of the alloy powder strip laid thereon for fusingly alloying and melting thereof into a molten alloy layer in the path of under and behind the laser gun, said molten alloy layer hardening into a bead trailing behind the laser gun. And the parameters of this laser fusing process were substantially as in the case of the eleventh preferred embodiment set described above. The alloying rate A (in percent) for each of the seven cases was then determined according to the formula explained above with regard to the fourth preferred embodiment set.

Figure 28:
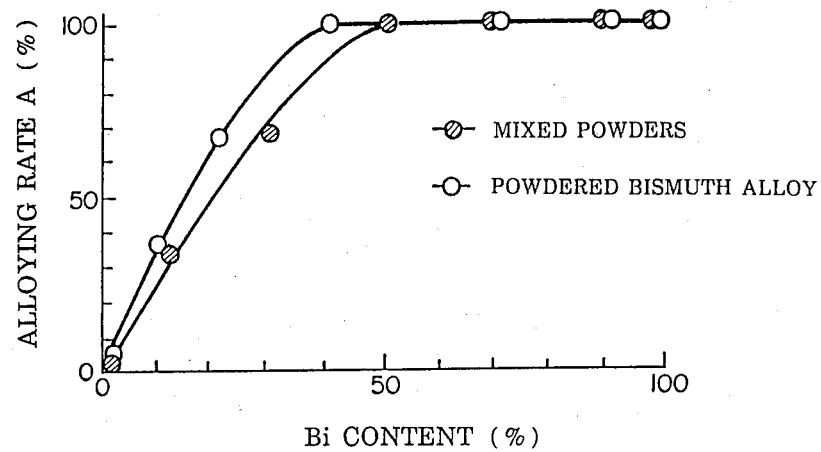
FIG. 28 is a graph in which results relating to the fourteenth set of preferred embodiments of the present invention are shown by dark spots and results relating to the fifteenth set of preferred embodiments are shown by light spots, and in which, for each case, bismuth content in percent of the alloy powder is shown along the horizontal axis and an alloying rate A in percent is shown along the vertical axis.

The results of these tests are shown by the seven dark spots and the line drawn with reference thereto in FIG. 28, which is a graph in which bismuth content in percent of the alloy powder is shown along the horizontal axis and the above defined alloying rate A in percent is shown along the vertical axis. From this graph it will be understood that, in this case that as alloy powder is used a mixture of a bismuth powder and a stellite alloy powder, it is preferable for the bismuth content of the alloy powder to be at least 21%; that particularly, in this case, in order for the method according to the present invention to form properly an appropriate alloy layer said alloy powder bismuth content should be at least 35%; and that even more preferably said bismuth content should be at least 41%.

The fifteenth set of preferred embodiments (Powdered alloy of bismuth and stellite alloy)

The fifteenth set of preferred embodiments of the method for forming an alloy layer on a substrate of the present invention were performed as follows. Initially, a set of seven quantities of alloy powder was produced by combining together in seven different weight ratios quantities of bismuth and quantities of stellite alloy, by fusing said bismuth and stellite alloy together so as to alloy them together, and then by powdering the resulting alloy to an average particle size of approximately −100 mesh. The bismuth contents of these seven alloy powder quantities were respectively approximately 2%, approximately 10%, approximately 32%, approximately 40%, approximately 71%, approximately 90%, and approximately 98%. And seven substrate material test sample pieces were prepared, each of substantially the same dimensions of approximately 70 mm×40 mm×10 mm as in the case of the previously described preferred embodiments, and again being made of substantially the same type of aluminum alloy of JIS (Japanese Industrial Standard) ADC-10.

Next, in each of the seven cases, an alloy layer bead was formed in substantially the same manner as in the first preferred embodiment disclosed above, i.e. by laying a strip of the particular alloy powder along along an upper face of one of the substrate aluminum alloy blocks, said strip being congealed together and stuck to said substrate block upper face by the use of binder and by scanning a $CO_2$ laser gun along said alloy powder strip, with the laser gun being operated so as to emit laser radiation and so as to cause local heating of the upper surface of the alloy block and of the alloy powder strip laid thereon for fusingly alloying and melting thereof into a molten alloy layer in the path of under and behind the laser gun, said molten alloy layer hardening into a bead trailing behind the laser gun. And the parameters of this laser fusing process were substantially as in the case of the eleventh preferred embodiment described above. The alloying rate A (in percent) for each of the seven cases was then determined according to the formula described above.

The results of these tests are shown by the seven light spots and the line drawn with reference thereto in the FIG. 28 graph. From this graph it will be understood that, in this case that as alloy powder is used a powdered form of a fused alloy of bismuth and a stellite alloy, it is preferable for the bismuth content of the alloy powder to be at least 15%; that particularly, in this case, in order for the method according to the present invention to form properly an appropriate alloy layer said alloy powder bismuth content should be at least 28%; and that even more preferably said bismuth content should be at least 32%.

The sixteenth set of preferred embodiments (Powdered copper mixed with powdered bismuth)

The sixteenth set of preferred embodiments of the method for forming an alloy layer on a substrate of the present invention were performed as follows. Initially, a set of nine quantities of alloy powder was produced by combining together in nine different weight ratios quantities of bismuth powder the same as used in the eleventh set of preferred embodiments (of average particle size approximately −250 mesh) and quantities of copper alloy powder having an average particle size approximately −100 mesh. The bismuth contents of these nine alloy powder quantities were respectively approximately 2%, approximately 10%, approximately 21%, approximately 31%, approximately 41%, approximately 51%, approximately 69%, approximately 89%, and approximately 97%. And nine substrate material test sample pieces were prepared, each of substantially the same dimensions of approximately 70 mm×40 mm×10 mm as in the case of the previously described preferred embodiments, and again being made of substantially the same type of aluminum alloy of JIS (Japanese Industrial Standard) ADC-10. And, in each of the nine cases, an alloy layer bead was formed in substantially the same manner as in the eleventh preferred embodiment disclosed above, i.e. by laying a strip of the particular alloy powder along along an upper face of one of the substrate aluminum alloy blocks, said strip being congealed together and stuck to said substrate block upper face by the use of binder and by scanning a $CO_2$ laser gun along said alloy powder strip, with the laser gun being operated so as to emit laser radiation and so as to cause local heating of the upper surface of the alloy block and of the alloy powder strip laid thereon for fusingly alloying and melting thereof into a molten alloy layer in the path of under and behind the laser gun, said molten alloy layer hardening into a bead trailing behind the laser gun. And the parameters of this laser fusing process were substantially as in the case of the eleventh preferred embodiment described above. The alloying rate A (in percent) for each of the nine cases was determined according to the formula described above.

Figure 29:
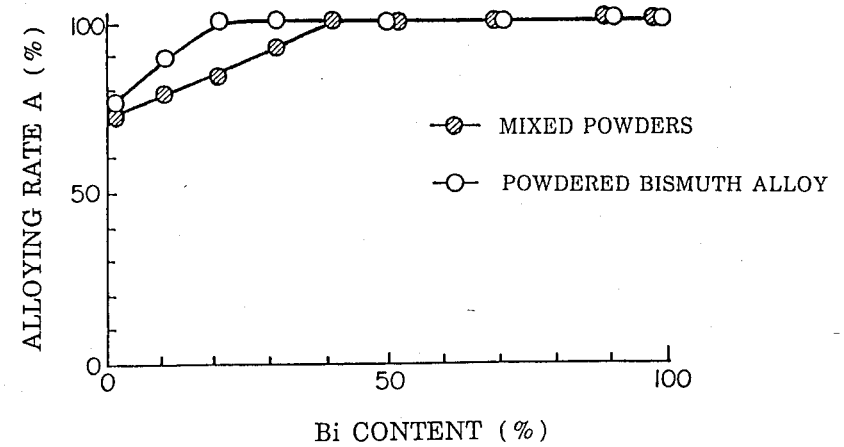
FIG. 29, similarly to FIG. 28 for the fourteenth and fifteenth sets of preferred embodiments, is a graph in which results relating to the sixteenth set of preferred embodiments of the present invention are shown by dark spots and results relating to the seventeenth set of preferred embodiments are shown by light spots, and in which, for each case, bismuth content in percent of the alloy powder is shown along the horizontal axis and the alloying rate A in percent is shown along the vertical axis.

The results of these tests are shown by the nine dark spots and the line drawn with reference thereto in FIG. 29, which is a graph similar to the FIG. 28 graph for the fourteenth and the fifteenth sets of preferred embodiments and relating to this sixteenth preferred embodiment set and to the seventeenth preferred embodiment set to be described shortly, in which again bismuth content in percent of the alloy powder is shown along the horizontal axis and the above defined alloying rate A in percent is shown along the vertical axis. From this graph it will be understood that, in this case that as alloy powder is used a mixture of a bismuth powder and a copper powder, it is preferable for the bismuth content of the alloy powder to be at least 13%; and that particularly said bismuth content should preferably be at least 29%.

The seventeenth set of preferred embodiments (Powdered alloy of bismuth and copper)

The seventeenth set of preferred embodiments of the method for forming an alloy layer on a substrate of the present invention were performed as follows. Initially, a set of nine quantities of alloy powder was produced by combining together in nine different weight ratios quantities of bismuth and quantities of copper, by fusing said bismuth and copper together so as to alloy them together, and then by powdering the resulting alloy to an average particle size of approximately −100 mesh. The bismuth contents of these nine alloy powder quantities were respectively approximately 2%, approximately 10%, approximately 21%, approximately 31%, approximately 41%, approximately 50%, approximately 70%, approximately 90%, and approximately 98%. And nine substrate material test sample pieces were prepared, each again of substantially the same dimensions of approximately 70 mm×40 mm×10 mm as in the case of the previously described preferred embodiments, and again being made of substantially the same type of aluminum alloy of JIS (Japanese Industrial Standard) ADC-10. And, in each of the nine cases, an alloy layer bead was formed in substantially the same manner as in the eleventh preferred embodiment disclosed above, i.e. by laying a strip of the particular alloy powder along along an upper face of one of the substrate aluminum alloy blocks, said strip being congealed together and stuck to said substrate block upper face by the use of binder and by scanning a $CO_2$ laser gun along said alloy powder strip, and the laser gun being operated so as to emit laser radiation and so as to cause local heating of the upper surface of the alloy block and of the alloy powder strip laid thereon for fusingly alloying and heating thereof into a molten alloy layer in the path of under and behind the laser gun, said molten alloy layer hardening into a bead trailing behind the laser gun. And the parameters of this laser fusing process were substantially as in the case of the eleventh preferred embodiment described above. The alloying rate A (in percent) for each of the nine cases was then determined according to the formula described above.

The results of these tests are shown by the nine light spots and the line drawn with reference thereto in the FIG. 29 graph. From this graph it will be understood that, in this case that as alloy powder is used a powdered form of a fused alloy of bismuth and copper, it is preferable for the bismuth content of the alloy powder to be at least 4%; and that particularly, in this case, in order for the method according to the present invention to form properly an appropriate alloy layer, said alloy powder bismuth content should be at least 10%.

Comment on the sixteenth and seventeenth sets of embodiments

It should be noted that, in these last two detailed cases in which as alloy powder was used either a mixture of a bismuth powder and a copper powder or a powdered form of a fused alloy of bismuth and copper, even when the content of bismuth in the alloy powder was relatively low, the alloying rate was 100% or a high value relatively close to 100%; and it is surmised that this is due to the high solid solubility of copper in aluminum alloy.

The eighteenth set of preferred embodiments (Powdered nickel mixed with powdered bismuth)

The eighteenth set of preferred embodiments of the method for forming an alloy layer on a substrate of the present invention were performed as follows. Initially, a set of seven quantities of alloy powder was produced by combining together in seven different weight ratios quantities of bismuth powder the same as used in the eleventh set of preferred embodiments (of average particle size approximately −250 mesh) and quantities of nickel alloy powder having an average particle size approximately −100 mesh. The bismuth contents of these seven alloy powder quantities were respectively approximately 2%, approximately 12%, approximately 32%, approximately 50%, approximately 70%, approximately 90%, and approximately 97%. And seven substrate material test sample pieces were prepared, each of substantially the same dimensions of approximately 70 mm×40 mm×10 mm as in the case of the previously described preferred embodiments, and again being made of substantially the same type of aluminum alloy of JIS (Japanese Industrial Standard) ADC-10. And, in each of the seven cases, an alloy layer bead was formed in substantially the same manner as in the eleventh preferred embodiment disclosed above, i.e. by laying a strip of the particular alloy powder along along an upper face of one of the substrate aluminum alloy blocks, said strip being congealed together and stuck to said substrate block upper face by the use of binder and by scanning a $CO_2$ laser gun along said alloy powder strip, with the laser gun being operated so as to emit laser radiation and so as to cause local heating of the upper surface of the alloy block and of the alloy powder strip laid thereon for fusingly alloying and melting thereof into a molten alloy layer in the path of under and behind the laser gun, said molten alloy layer hardening into a bead trailing behind the laser gun. And the parameters of this laser fusing process were substantially as in the case of the eleventh preferred embodiment described above. The alloying rate A (in percent) for each of the seven cases was again determined according to the formula described above.

Figure 30:
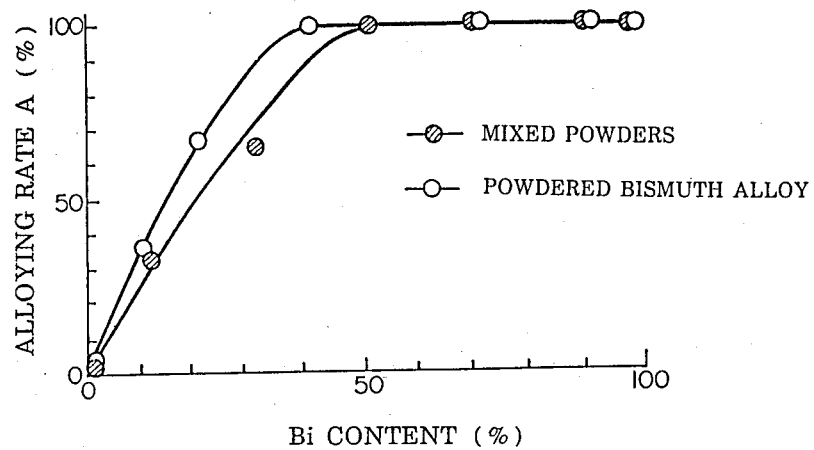
FIG. 30, similarly to FIG. 28 for the fourteenth and fifteenth sets of preferred embodiments and FIG. 29 for the sixteenth and seventeenth sets of preferred embodiments, is a graph in which results relating to the eighteenth set of preferred embodiments are shown by dark spots and results relating to the nineteenth set of preferred embodiments are shown by light spots, and in which, for each case, bismuth content in percent of the alloy powder is shown along the horizontal axis and the alloying rate A in percent is shown along the vertical axis.

The results of these tests are shown by the seven dark spots and the line drawn with reference thereto in FIG. 30, which is a graph similar to the FIG. 28 and FIG. 29 graphs for the fourteenth through the seventeenth sets of preferred embodiments and relating to this eighteenth preferred embodiment set and to the nineteenth preferred embodiment set to be described shortly, in which again bismuth content in percent of the alloy powder is shown along the horizontal axis and the above defined alloying rate A in percent is shown along the vertical axis. From this graph it will be understood that, in this case that as alloy powder is used a mixture of a bismuth powder and a nickel powder, it is preferable for the bismuth content of the alloy powder to be at least 21%; that particularly, in this case, in order for the method according to the present invention to form properly an appropriate alloy layer said alloy powder bismuth content should be at least 35%; and that even more preferably said bismuth content should be at least 41%.

The nineteenth set of preferred embodiments (Powdered alloy of bismuth and nickel)

The nineteenth set of preferred embodiments of the method for forming an alloy layer on a substrate of the present invention were performed as follows. Initially, a set of seven quantities of alloy powder was produced by combining together in seven different weight ratios quantities of bismuth and quantities of nickel, by fusing said bismuth and nickel together so as to alloy them together, and then by powdering the resulting alloy to an average particle size of approximately −100 mesh. The bismuth contents of these seven alloy powder quantities were respectively approximately 2%, approximately 10%, approximately 21%, approximately 41%, approximately 71%, approximately 91%, and approximately 98%. And seven substrate material test sample pieces were prepared, each again of substantially the same dimensions of approximately 70 mm×40 mm×10 mm as in the case of the previously described preferred embodiments, and again being made of substantially the same type of aluminum alloy of JIS (Japanese Industrial Standard) ADC-10. And, in each of the seven cases, an alloy layer bead was formed in substantially the same manner as in the eleventh preferred embodiment disclosed above, i.e. by laying a strip of the particular alloy powder along along an upper face of one of the substrate aluminum alloy blocks, said strip being congealed together and stuck to said substrate block upper face by the use of binder and by scanning a $CO_2$ laser gun along said alloy powder strip, with the laser gun being operated so as to emit laser radiation and so as to cause local heating of the upper surface of the alloy block and of the alloy powder strip laid thereon for fusingly alloying and melting thereof into a molten alloy layer in the path of under and behind the laser gun, said molten alloy layer hardening into a bead trailing behind the laser gun. And the parameters of this laser fusing process were substantially as in the case of the eleventh preferred embodiment described above. The alloying rate A (in percent) for each of the seven cases was then determined according to the formula described above.

The results of these tests are shown by the seven light spots and the line drawn with reference thereto in the FIG. 30 graph. From this graph it will be understood that, in this case that as alloy powder is used a powdered form of a fused alloy of bismuth and nickel, it is preferable for the bismuth content of the alloy powder to be at least 15%; that particularly, in this case, in order for the method according to the present invention to form properly an appropriate alloy layer said alloy powder bismuth content should be at least 28%; and that even more preferably said bismuth content should be at least 32%.

Comment on the fourteenth through the nineteenth sets of embodiments

From the fourteenth through the nineteenth sets of preferred embodiments described above, as a summary, it will be understood that: in the case that as alloy powder is used a powder mixture of a bismuth powder and a powder of an element to be alloyed with the aluminum alloy substrate block, it is preferable for the bismuth content of the alloy powder to be at least 21%, more preferably at least 35%, and even more preferably at least 41%; while, in the alternative case that as alloy powder is used a powdered form of a fused alloy of bismuth and said element to be alloyed with said aluminum alloy substrate block, it is preferable for the bismuth content of the alloy powder to be at least 15%, more preferably at least 28%, and even more preferably at least 32%.

The twentieth set of preferred embodiments (Powdered nickel mixed with powdered bismuth)
(Effect of variation of bismuth powder particle size)

The twentieth set of preferred embodiments of the method for forming an alloy layer on a substrate of the present invention were performed as follows. Initially, a set of nine quantities of alloy powder was produced by combining together, in each case in a weight ratio of approximately 1:1, quantities of stellite alloy powder of the type used in the eleventh set of preferred embodiments described above and having an average particle size approximately −100 mesh, and quantities of bismuth powder of nine different average particle sizes, to wit: approximately −3.5 mesh, approximately −5 mesh, approximately −10 mesh, approximately −42 mesh, approximately −48 mesh, approximately −60 mesh, approximately −150 mesh, approximately −250 mesh, and approximately −325 mesh. And nine substrate material test sample pieces were prepared, each of substantially the same dimensions of approximately 70 mm×40 mm×10 as in the case of the previously described preferred embodiments, and again being made of substantially the same type of aluminum alloy of JIS (Japanese Industrial Standard) ADC-10. And, in each of the nine cases, an alloy layer bead was formed in substantially the same manner as in the eleventh preferred embodiment disclosed above, i.e. by laying a strip of the particular alloy powder along along an upper face of one of the substrate aluminum alloy blocks, said strip being congealed together and stuck to said substrate block upper face by the use of binder and by scanning a $CO_2$ laser gun along said alloy powder strip, with the laser gun being operated so as to emit laser radiation and so as to cause local heating of the upper surface of the alloy block and of the alloy powder strip laid thereon for fusingly alloying and melting thereof into a molten alloy layer in the path of under and behind the laser gun, said molten alloy layer hardening into a bead trailing behind the laser gun. And the parameters of this laser fusing process were substantially as in the case of the eleventh preferred embodiment described above. The alloying rate A (in percent) for each of the nine cases was again determined according to the formula described above.

Figure 31:
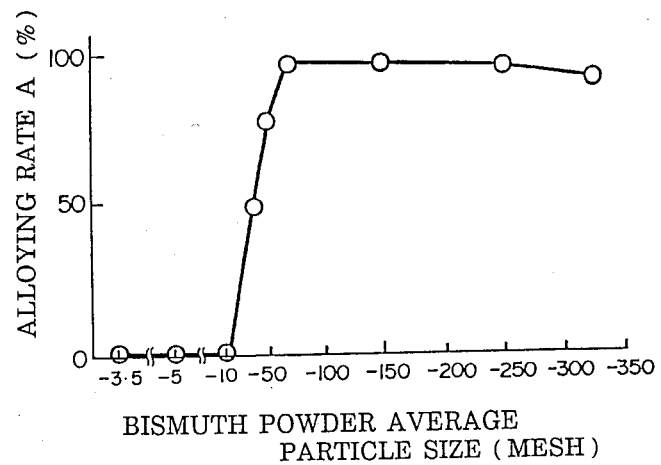
FIG. 31 is a graph relating to the twentieth set of preferred embodiments of the present invention, similar to FIG. 17 relating to the tenth set of preferred embodiments, in which, for each of various cases, average particle size in mesh of the bismuth powder included in the alloy powder is shown along the horizontal axis and the alloying rate A in percent is shown along the vertical axis.

The results of these tests are shown by the nine spots and the line drawn with reference thereto in FIG. 31, which is a graph relating to this twentieth preferred embodiment set in which average particle size in mesh of the alloy powder is shown along the horizontal axis and the above defined alloying rate A in percent is shown along the vertical axis. From this graph it will be understood that, in this case that as alloy powder is used a mixture of a bismuth powder and a stellite powder, it is preferable for the average particle size of the bismuth powder included in the alloy powder to be no more than about −42 mesh, more preferably no more than about −48 mesh, and even more preferably from about −55 mesh to about −325 mesh. And it should be noted that, in the cases that the average particle size of the bismuth powder included in the alloy powder was greater than or equal to about −10 mesh, it was not possible satisfactorily to dispose the alloying powder on the surface of the substrate aluminum alloy blocks.

Further variant embodiments

As a variant set of preferred embodiments of the present invention, another set of nine quantities of alloy powder was produced by using quantities of a bismuth-copper alloy (composition about 50% bismuth, remainder substantially copper) which had been ground into powder of nine different average particle sizes (unit mesh), to wit: approximately −3.5 mesh, approximately −5 mesh, approximately −10 mesh, approximately −42 mesh, approximately −48 mesh, approximately −60 mesh, approximately −150 mesh, approximately −250 mesh, and approximately −325 mesh. And nine substrate material test sample pieces were prepared, each of substantially the same dimensions of approximately 70 mm×40 mm×10 mm as in the case of the previously described preferred embodiments, and again being made of substantially the same type of aluminum alloy of JIS (Japanese Industrial Standard) ADC-10. And, in each of the nine cases, an alloy layer bead was formed in substantially the same manner as in the eleventh preferred embodiment disclosed above, the parameters of this laser fusing process being substantially as in the case of said eleventh preferred embodiment. The alloying rate A (in percent) for each of the nine cases was again determined according to the formula described above; and the results of these tests were found to be generally similar to those detailed above with regard to the twentieth preferred embodiment and shown in FIG. 31.

Although the present invention has been shown and described in terms of the preferred embodiments thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. A method for forming an alloy layer on a surface of an aluminum alloy substrate comprising:

disposing a powder for alloying upon the surface of said aluminum alloy substrate, said powder for alloying comprising a mixture of a powder of bismuth and a powder of a substance to be alloyed with said aluminum alloy substrate, the average particle size of said bismuth powder in said powder for alloying being not more than about −42 mesh and the bismuth content of said powder for alloying being at least 21%; and irradiating said powder for alloying as disposed upon said surface of said aluminum alloy substrate with a $CO_2$ laser so as to melt and fuse said powder for alloying and a surface portion of said aluminum alloy substrate thereby to alloy them together;

wherein the composition, particle size and disposition on said surface of said aluminum alloy substrate of said powder for alloying, the composition and dimensions of said aluminum alloy substrate, the power output, output mode, beam pattern and beam scanning speed of said laser, and the atmosphere of melting and fusing of said powder for alloying and the surface portion of said aluminum alloy substrate are such that, when neither silicon nor bismuth are included in said powder for alloying, substantially no alloy layer is formed on the surface portion of said aluminum alloy substrate; and wherein bismuth is incorporated in said powder for alloying so that said alloy layer is formed at an alloying rate which is substantially proportional to the content of bismuth and increases to be substantially 100 percent before the content of bismuth reaches approximately 50 percent.

2. A method for forming an alloy layer on a surface of an aluminum alloy substrate, comprising the steps of:

(a) disposing a powder for alloying upon the surface of said aluminum alloy substrate, said powder for alloying comprising a powder of an alloy of bismuth and a substance to be alloyed with said aluminum alloy substrate, the average particle size of said powder for alloying being not more than about −42 mesh and the bismuth content of said powder for alloying being at least 15%; and (b) irradiating said powder for alloying as disposed upon said surface of said aluminum alloy substrate with a $CO_2$ laser so as to melt and fuse said powder for alloying and a surface portion of said aluminum alloy substrate thereby forming an alloy layer on the surface of said aluminum alloy substrate.

3. A method for forming an alloy layer on a surface of an aluminum alloy substrate comprising:

disposing a powder for alloying upon the surface of said aluminum alloy substrate, said powder for alloying comprising a powder of an alloy of bismuth and a substance to be alloyed with said aluminum alloy substrate, the average particle size of said powder for alloying being not more than about −42 mesh and the bismuth content of said powder for alloying being at least 15%; and irradiating said powder for alloying as disposed upon said surface of said aluminum alloy substrate with a $CO_2$ laser so as to melt and fuse said powder for alloying and a surface portion of said aluminum alloy substrate thereby to alloy them together;

wherein the composition, particle size and disposition on said surface of said aluminum alloy substrate of said powder for alloying, the composition and dimensions of said aluminum alloy substrate, the power output, output mode, beam pattern and beam scanning speed of said laser, and the atmosphere of melting and fusing of said powder for alloying and the surface portion of said aluminum alloy substrate are such that, when neither silicon nor bismuth are included in said powder for alloying, substantially no alloy layer is formed on the surface portion of said aluminum alloy substrate; and wherein bismuth is incorporated in said powder for alloying so that said alloy layer is formed at an alloying rate which is substantially proportional to the content of bismuth and increases to be substantially 100 percent before the content of bismuth reaches approximately 50 percent.

4. A method for forming an alloy layer on a surface of an aluminum alloy substrate, comprising the steps of:

(a) disposing a powder for alloying upon the surface of said aluminum alloy substrate, said powder for alloying comprising a mixture of a powder of bismuth and a powder of a substance to be alloyed with said aluminum alloy substrate, the average particle size of said bismuth powder in said powder for alloying being not more than about −42 mesh and the bismuth content of said powder for alloying being at least 21%; and (b) irradiating said powder for alloying as disposed upon said surface of said aluminum alloy substrate with a $CO_2$ laser so as to melt and fuse said powder for alloying and a surface portion of said aluminum alloy substrate thereby forming an alloy layer on the surface of said aluminum alloy substrate.

* * * * *